(12) United States Patent
Huang et al.

(10) Patent No.: US 10,252,148 B2
(45) Date of Patent: Apr. 9, 2019

(54) DEALING ROBOT DEVICE WITH DUAL CARD SHOES

(71) Applicant: Taiwan Intelligent Robotics Company Ltd., Taipei (TW)

(72) Inventors: Kuo-Tsung Huang, Taipei (TW); Chun-Hsiang Su, Taipei (TW); Bing-Chuen Tsai, Taipei (TW); Yen-Hung Lai, Taipei (TW)

(73) Assignee: TAIWAN INTELLIGENT ROBOTICS COMPANY LTD., Taipei (TW)

( * ) Notice: Subject to any disclaimer, the term of this patent is extended or adjusted under 35 U.S.C. 154(b) by 0 days.

(21) Appl. No.: 15/836,351

(22) Filed: Dec. 8, 2017

(65) Prior Publication Data

US 2018/0099211 A1 Apr. 12, 2018

Related U.S. Application Data

(63) Continuation-in-part of application No. 14/882,454, filed on Oct. 14, 2015, now abandoned.

(30) Foreign Application Priority Data

Jun. 12, 2015 (TW) .............................. 104119018 A

(51) Int. Cl.
| | | |
|---|---|---|
| A63F 9/24 | (2006.01) | |
| A63F 1/14 | (2006.01) | |
| G07F 17/32 | (2006.01) | |
| B25J 11/00 | (2006.01) | |
| A63F 1/00 | (2006.01) | |

(52) U.S. Cl.
CPC ............... *A63F 1/14* (2013.01); *B25J 11/003* (2013.01); *G07F 17/32* (2013.01); *A63F 1/00* (2013.01); *A63F 2001/005* (2013.01); *A63F 2009/2435* (2013.01); *A63F 2009/2482* (2013.01)

(58) Field of Classification Search
None
See application file for complete search history.

(56) References Cited

U.S. PATENT DOCUMENTS

| | | | | |
|---|---|---|---|---|
| 2013/0337922 A1* | 12/2013 | Kuhn | ........................ | A63F 1/06 463/47 |
| 2014/0309006 A1* | 10/2014 | Shigeta | ..................... | A63F 1/00 463/11 |
| 2015/0348371 A1* | 12/2015 | Blazevic | ............. | G07F 17/3288 463/11 |

* cited by examiner

*Primary Examiner* — Paul A D'Agostino
(74) *Attorney, Agent, or Firm* — Chun-Ming Shih

(57) ABSTRACT

A dealing robot device with dual card shoes is provided in the present application. The dealing robot device comprises a machine robotic arm, an electric poker rack, a controller and dual card shoes. The controller sends a controlling instruction to regulate movements of the robotic arm or the electric poker rack with which operations such as dealing or recollecting poker cards is completed such that a time difference between two rounds of games played by two different groups of players is effectively saved by the dealing robot device with dual card shoes. Accordingly, the efficiency of an online reality poker game is promoted by the dealing robot device with dual card shoes in the present application.

29 Claims, 32 Drawing Sheets

DEALING ROBOT DEVICE WITH DUAL CARD SHOES

This application is a continuation-in-part application of U.S. application Ser. No. 14/882,454 filed on 2015 Oct. 14, now pending, which is based on, and claims the priority benefit of Taiwan application no. 104119018, filed on 2015 Jun. 12. The contents of each of the above-mentioned patent applications is hereby incorporated by reference herein in its entirety and made a part of this specification.

BACKGROUND OF THE INVENTION

1. Field of the Invention

The present disclosure relates to a robot device, particularly a dealing robot device with dual card shoes for dealing poker cards.

2. Description of the Prior Art

Currently, a poker dealer who hosts a poker game has to deal poker cards to players and decide a winner in a round by values of poker cards held in players. In this regard, the job for dealing may be a heavy burden for a poker dealer who feels tired when facing many players in a large-size casino and working long hours by dealing poker cards repeatedly.

In addition, a casino manager managing poker games based on manual dealing may not control personal conditions of every single poker dealer who still takes charge of a poker game when feeling exhausted.

Moreover, a poker game is delayed easily when a poker dealer fails to report the progress and statistic data of a poker game in a large-scale competition immediately.

As shown in U.S. patent application Ser. No. 14/882,454, a dealing robot device comprises a robotic arm, an electric card shelf, and a controller: the robotic arm has a porker card acquiring portion with which outside poker cards are fetched; the robotic arm is adjacent to a table; the electric card shelf is installed on the desktop of the table; the controller electrically connected to both the robotic arm and the electrical card shelf is used to configure the robotic arm or the electric card shelf according to instructions.

However, the dealing robot device, which is provided with a single card shoe, takes some time to wait information such as game progress and statistics of an online reality poker game announced between two rounds of games and serves one group of players only in each round. Accordingly, another group of players have to wait the previous round finished by the former group players before start of a new round or opt out of a gambling party after drawn-out waiting time.

In summary, how to provide a dealing control device which serves two groups of players efficiently in poker games is an issue deserving to be settled by the persons skilled in the art.

SUMMARY OF THE INVENTION

The present disclosure is intended to provide a dealing robot device which deals poker cards without abovementioned problems.

To this ends, the present disclosure provides a dealing robot device which comprises a robotic arm, an electric card shelf, a controller, a first card shoe and a second card shoe. The robotic arm has a poker card acquiring portion which is used to capture external poker cards. The robotic arm is adjacent to a table. The electric card shelf is installed on a desktop of the table. The controller, which is electrically connected to the robotic arm and the electric card shelf, is configured to operate the robotic arm or the electric card shelf according to instruction information. Both the first card shoe and the second card shoe are installed at a position from which outside poker cards are fetched by the robotic arm.

In summary, a dealing robot device in the present disclosure controlled by instruction information is competent in dealing porker cards based on different card shoes alternatively for better efficiency of an online reality porker game.

BRIEF DESCRIPTION OF THE DRAWINGS

For a better understanding of the aforementioned embodiments of the invention as well as additional embodiments thereof, reference should be made to the Description of Embodiments below, in conjunction with the following drawings in which like reference numerals refer to corresponding parts throughout the figures.

DETAILED DESCRIPTION OF THE PREFERRED EMBODIMENT

The following description is about embodiments of the present invention; however it is not intended to limit the scope of the present invention.

Figure 1:
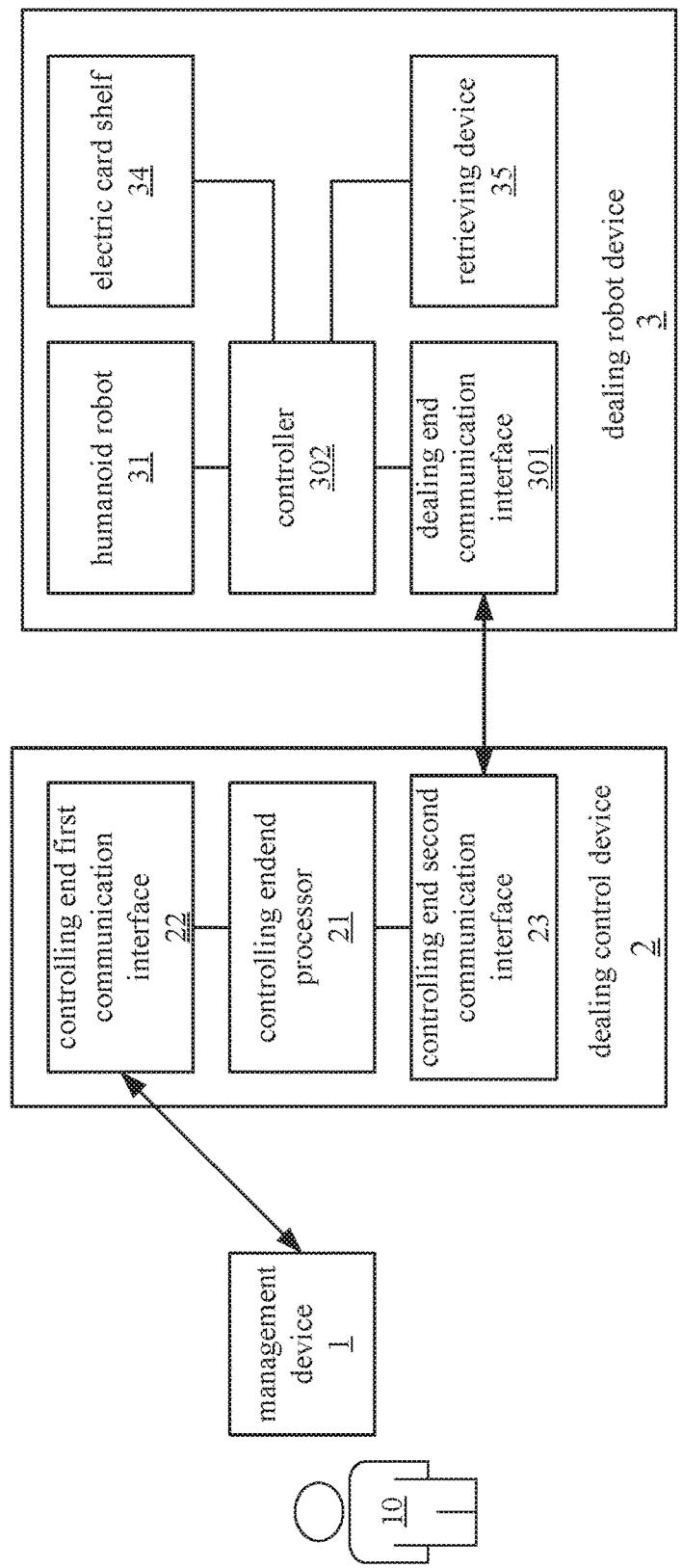
FIG. 1 is a schematic view of a dealing system in an embodiment.

Referring to FIG. 1, which is a schematic view of a dealing system in an embodiment. The dealing system comprises a management device 1, a dealing control device 2 and a dealing robot device 3. The dealing control device 2 is connected to the dealing control device 2 and the dealing robot device 3. In the embodiment, a dealing system is explained with but not limited to a single dealing control device 2 and a single dealing robot device 3. The management device 1 links and manages a plurality of dealing control devices 2; the dealing control device 2 also links and controls a plurality of dealing robot devices 3.

The management device 1, the dealing control device 2 and a controller 302 in the dealing robot device 3 are electronic devices with computing power such as computer, programmable digital circuit and microprocessor. The management device 1 is further equipped with a user interface (software interface or hardware interface) by which an administrator 10 performs operations. The abovementioned microprocessor is connected to non-volatile memories in which an operation system, program instructions and other relevant information are saved.

The dealing control device 2 comprises a control-side processor 21, a control-side first communication interface 22 and a control-side second communication interface 23. The control-side first communication interface 22 links the management device 1 so that the management device 1 manages the dealing control device 2 through the control-side first communication interface 22. The control-side second communication interface 23 is electrically connected to an external dealing device (such as the dealing robot device 3). The control-side processor 21 links the control-side communication interfaces through which control instructions regulating the dealing robot device 3 are sent. The control instructions comprise initial setting instruction information, dealing instruction information, retrieving instruction information, etc.

Specifically, the initial setting instruction information is related to initial settings of internal parameters, motions and postures of the dealing robot device 3. The dealing instruction information is related to directing a robotic arm 311 of the dealing robot device 3 to fetch poker cards 321 and put the poker cards 321 on a table. The dealing round information activates the robotic arm 311 of the dealing robot device 3 to put the poker cards 321 on specific positions of a card shelf (positions for a banker's (player's) first to third cards). The retrieving instruction information is related to directing the dealing robot device 3 to retrieve the poker cards 321 on a card shelf.

The dealing robot device 3 further comprises a dealing-side communication interface 301, a controller 302, a humanoid robot 31, an electric card shelf 34 and a retrieving device 35. The controller 302 links the dealing-side communication interface 301, the humanoid robot 31, the electric card shelf 34 and the retrieving device 35. The dealing-side communication interface 301 is configured to communicate with the control-side second communication interface 23 for transmission of instructions from the control-side processor 21 to the controller 302.

The abovementioned communication interfaces are wired or wireless communication interfaces. A wired communication interface is a telephone line interface, an optical fiber interface or a network interface. A wireless communication interface is applicable to 2G/3G/4G, Wi-Fi, Wi-MAX, etc. The abovementioned communication interfaces as examples explained herein are not limited to the wired or wireless communication interfaces.

A dealing system in the present application available to various poker games is further explained in dealing steps of Baccarat.

Figure 2:
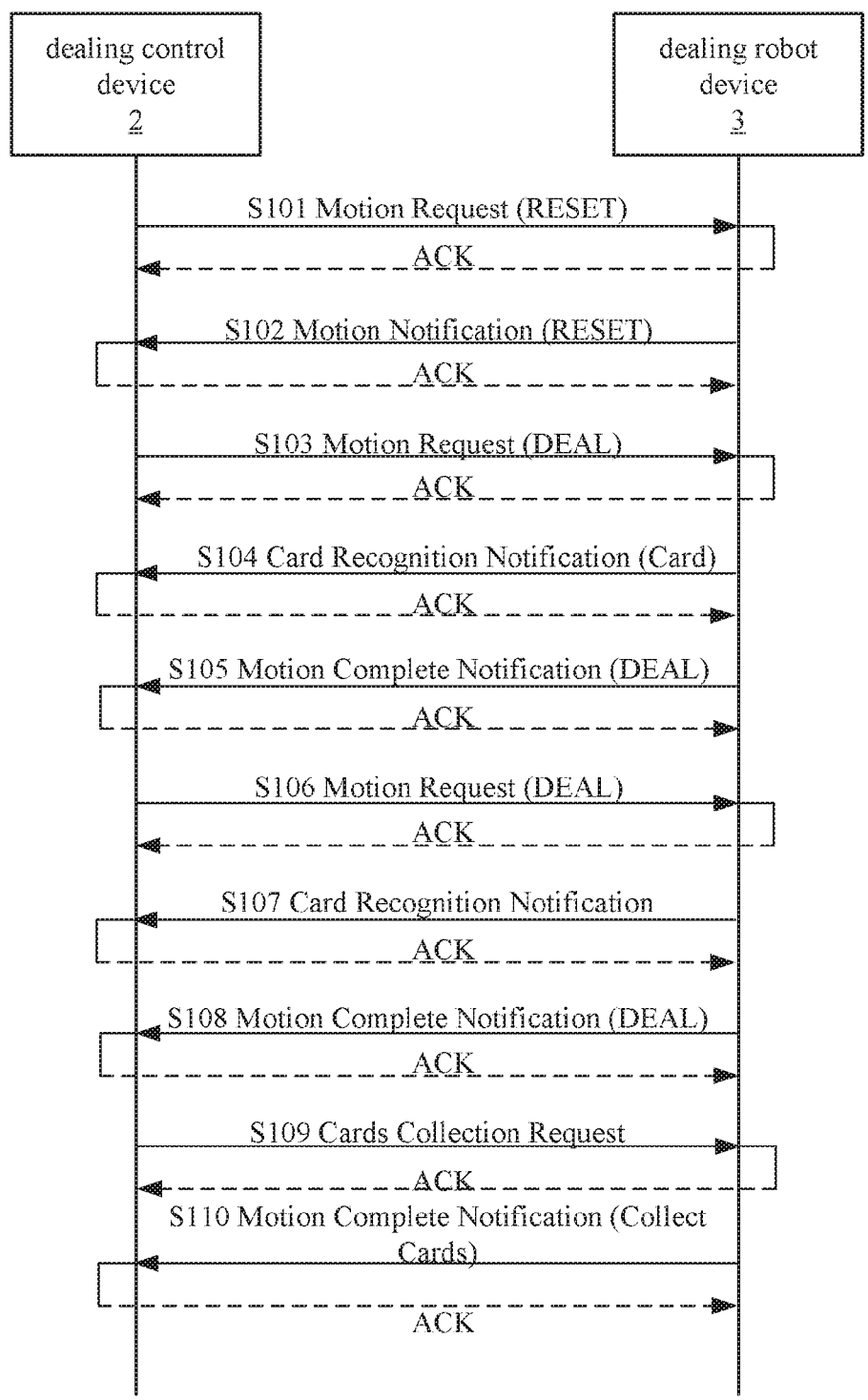
FIG. 2 is a schematic view of a control process of a dealing system.

Referring to FIG. 2, which is a schematic view of a control procedure of a dealing system in the present disclosure. With the dealing system activated, the dealing control device 2 issues instruction information for initial settings to the dealing robot device 3. The steps to transmit the instruction information are explained as follows:

S101: The dealing control device 2 issues a request (Program instruction: Motion Request (REST)) to the dealing robot device 3; the dealing robot device 3 receiving the request responds to the dealing control device 2 by sending an acknowledgement message (ACK).

S102: The dealing robot device 3 which completed resetting issues a notification (Program instruction: Motion Notification (RESET)) to the dealing control device 2; the dealing control device 2 receiving the notification responds to the dealing robot device 3 by sending an acknowledgement message (ACK).

With the initial settings completed, a dealing system executes the following instruction information for dealing in the first and second rounds. The steps are explained as follows:

S103: The dealing control device 2 issues a request (Program instruction: Motion Request (DEAL)) to the dealing robot device 3; the dealing robot device 3 which completed dealing responds to the dealing control device 2 by sending an acknowledgement message (ACK).

S104: The dealing robot device 3 acquires a card value through an image acquiring device (not shown in the figure) and inform the dealing control device 2 of the card value by sending a notification (Program instruction: Card Recognition Notification (Card)); the dealing control device 2 receiving the card value responds to the dealing robot device 3 by sending an acknowledgement message (ACK). (The parameter "Card" comprises information related to a poker card 321 such as suit and value.)

S105: The dealing robot device 3 receiving the acknowledgement message in S104 issues a notification (Program instruction: Motion Complete Notification (DEAL)) to the dealing control device 2; the dealing control device 2 receiving the notification responds to the dealing robot device 3 by sending an acknowledgement message (ACK).

The abovementioned image acquiring module comprises a photographic lens and a modular PCB on which electric circuits for image processing are installed. An image of a poker card 321 acquired through the image acquiring module can be transmitted from the dealing robot device 3 directly or recognized by the dealing robot device 3 for the suit and the value on the poker card 321. The control-side processor 21 receiving the card value sets up instructions such as dealing poker cards 321 to a banker/player in the nth round.

The dealing control device 2 relies on card values transmitted from the dealing robot device 3 to decide whether a third poker card should be dealt based on rules in Table 1 after two poker cards were dealt on the banker's (player's) card shelf. The dealing control device 2 which decides to deal the third poker card will execute dealing instruction information form S106 to S108.

TABLE 1

| Total value of two cards | Player | Banker |
| --- | --- | --- |
| 0 | Deal a poker card. | Deal a poker card. |
| 1 | Deal a poker card. | Deal a poker card. |
| 2 | Deal a poker card. | Deal a poker card. |
| 3 | Deal a poker card. | 8, the value of the player's third poker card: Do not deal a poker card; Other value: Deal a poker card. |
| 4 | Deal a poker card. | 0, 1, 8 or 9, the value of the player's third poker card: Do not deal a poker card; Other value: Deal a poker card. |
| 5 | Deal a poker card. | 0, 1, 2, 3, 8 or 9, the value of the player's third poker card: Do not deal a poker card; Other value: Deal a poker card. |
| 6 | Do not deal a poker card. | 6 or 7, the value of the player's third poker card: Deal a poker card; Other value: Do not deal a poker card. |
| 7 | Do not deal a poker card. | Do not deal a poker card. |
| 8 | Do not deal a poker card. | Do not deal a poker card. |
| 9 | Do not deal a poker card. | Do not deal a poker card. |

S106: The dealing control device 2 issues a request (Program instruction: Motion Request (DEAL)) to the dealing robot device 3; the dealing robot device 3 which completed dealing responds to the dealing control device 2 by sending an acknowledgement message (ACK).

S107: The dealing robot device 3 acquires a card value of a poker card 321 in S106 through an image acquiring device and sends a notification (Program instruction: Card Recognition Notification) to the dealing control device 2; the dealing control device 2 receiving the card value responds to the dealing robot device 3 by sending an acknowledgement message (ACK).

S108: The dealing robot device 3 receiving the acknowledgement message in S107 issues a notification (Program instruction: Motion Complete Notification (DEAL)) to the dealing control device 2; the dealing control device 2 receiving the notification responds to the dealing robot device 3 by sending an acknowledgement message (ACK).

S109: The dealing control device 2 issues a request of retrieving poker cards 321 (Program instruction: Cards Collection Request) to the dealing robot device 3; the dealing robot device 3 receiving the request sends an acknowledgement message (ACK).

S110: The dealing robot device 3 which retrieved poker cards issues a notification (Motion Complete Notification (Collect Cards)) to the dealing control device 2; the dealing control device 2 receiving the notification sends an acknowledgement message (ACK).

Figure 3:
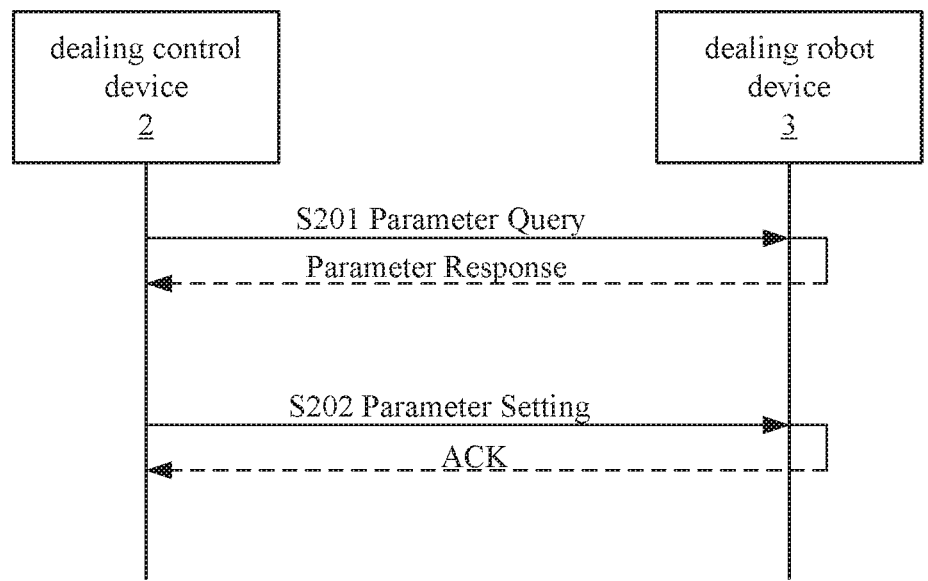
FIG. 3 is a schematic view illustrating a process of a dealing control device which issues parameters.

With dealing completed, the dealing control device 2 or a terminal unit controlling the dealing control device 2 calculates a total value of poker cards held by a banker (player) to create outcome information by deciding a winner (the banker or the player) or a draw in a round Referring to FIG. 3, which illustrates the dealing control device 2 issues control instructions based on the following steps to change specific parameters of the dealing robot device 3:

S201: The dealing control device 2 issues an instruction, Parameter Query, to the dealing robot device 3; the dealing robot device 3 receiving the instruction responds to the dealing control device 2 by sending a message, Parameter Response.

S202: The dealing control device 2 receiving the message in S201 issues an instruction, Parameter Setting, to the dealing robot device 3; the dealing robot device 3, which received and executed the instruction, responds to the dealing control device 2 by sending an acknowledge message (ACK).

In the present disclosure, the dealing robot device 3 is a humanoid robot 31 and the abovementioned parameters are settings to control postures and motions of the humanoid robot 31 and expressions on a face 310.

Figure 4:
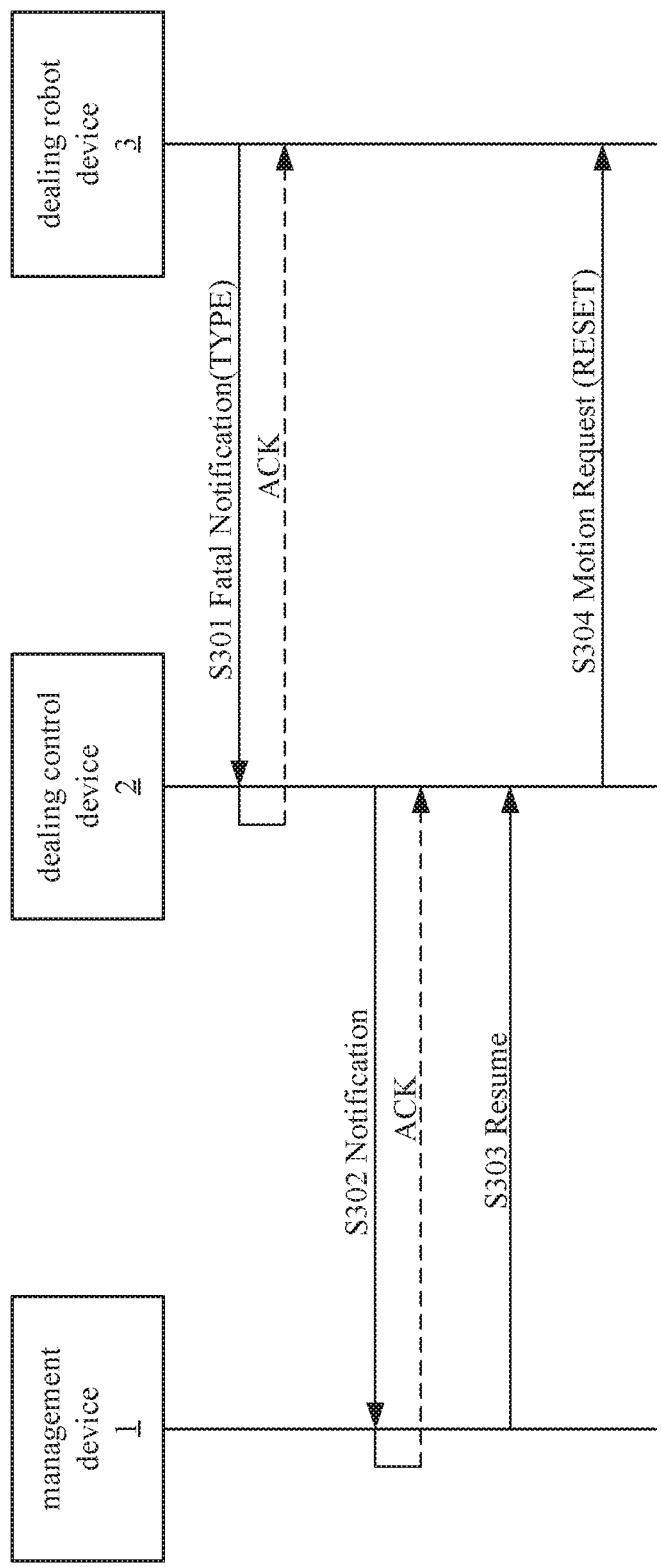
FIGS. 4 and 5 are schematic views which illustrate a process of troubleshooting of a dealing system.

Referring to FIG. 4, which illustrates the dealing control device 2 further links the management device 1 operated by an administrator and used to reset the dealing robot device 3. The steps to configure the dealing robot device 3 are shown as follows:

S301: The dealing robot device 3, which detects any internal error, issues an error message (Program instruction: Fatal Notification (TYPE)) to the dealing control device 2; the dealing control device 2 receiving the message responds to the dealing robot device 3 by sending an acknowledgement message (ACK). ("TYPE", a parameter in the error message, means software error, hardware error, power failure, overheat, etc.)

S302: The dealing robot device 3 issues a notification to the management device 1; the management device 1 receiving the notification responds to the dealing robot device 3 by sending an acknowledgement message (ACK).

S303: The management device 1 issues an instruction, Resume, to the dealing control device 2.

S304: The dealing control device 2 receiving the instruction in S303 issues a request (Program instruction: Motion Request (RESET)) to the dealing robot device 3; the dealing robot device 3 is reset.

Figure 5:
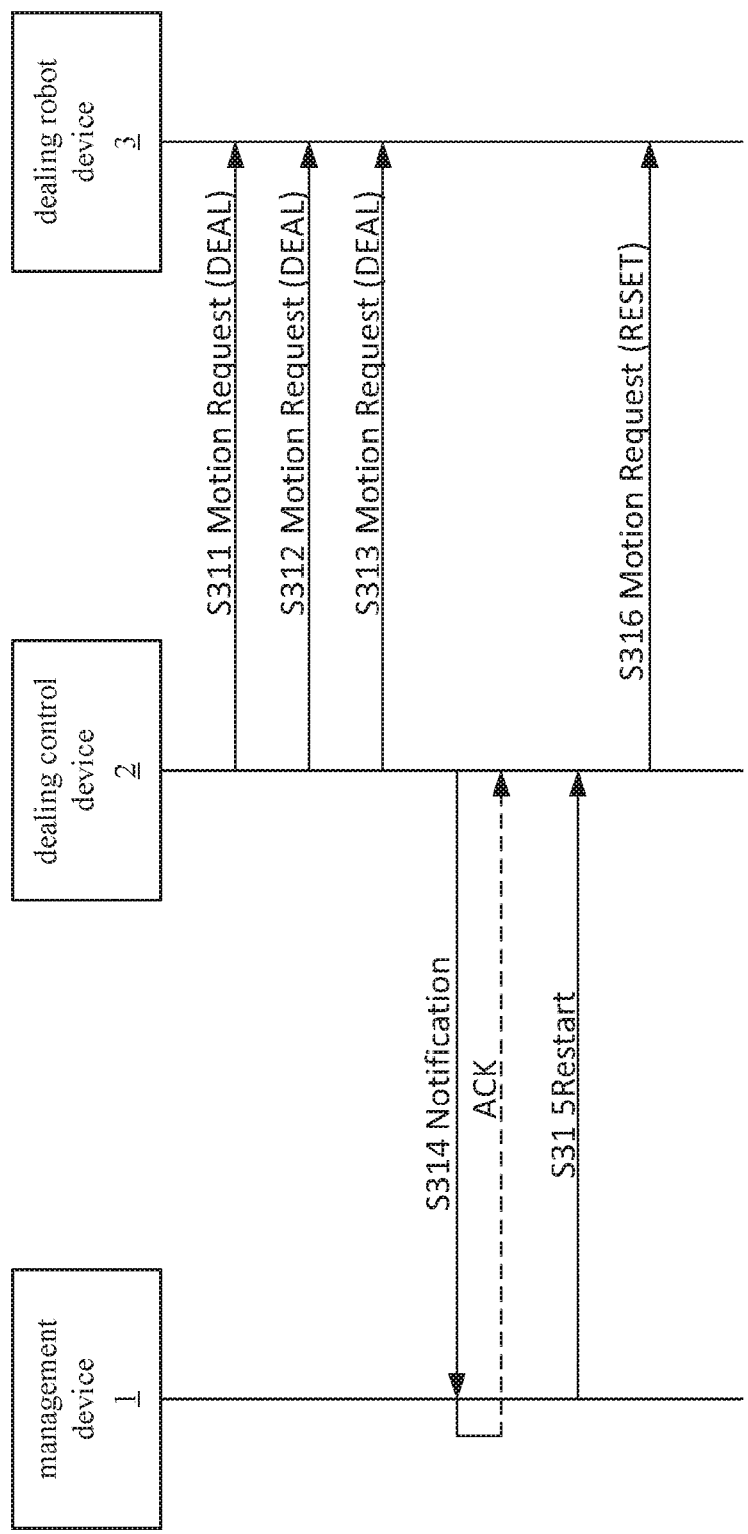

Referring to FIG. 5, which illustrates the dealing control device 2 having issued n motion requests to the dealing robot device 3 but received no response from the dealing robot device 3 informs the management device 1 of current status and the management device 1 issues an instruction, Reset, to reactivate the dealing robot device 3. As shown in the following steps, the above operation is enabled when the dealing control device 2 issued three motion requests but received no response from the dealing robot device 3:

S311: The dealing control device 2 issues a request (Program instruction: Motion Request (DEAL)) to the dealing robot device 3; the dealing robot device 3 does not send an acknowledgement message to the dealing control device 2 (no response for the first time).

S312: The dealing control device 2 issues a request (Program instruction: Motion Request (DEAL)) to the dealing robot device 3; the dealing robot device 3 does not send an acknowledgement message to the dealing control device 2 (no response for the second time).

S313: The dealing control device 2 issues a request (Program instruction: Motion Request (DEAL)) to the dealing robot device 3; the dealing robot device 3 does not send an acknowledgement message to the dealing control device 2 (no response for the third time).

S314: The dealing control device 2 issues a notification to the management device 1; the management device 1 receiving the notification responds to the dealing control device 2 by sending an acknowledge message (ACK).

S315: The management device 1 issues an instruction, Restart, to the dealing control device 2.

S316: The dealing control device 2 receiving the instruction in S135 issues a request (Program instruction: Motion request (RESET)) to the dealing robot device 3; the dealing robot device 3 is reactivated.

The program instructions in the present disclosure are functions which are created with one of computer programming languages including, without limitation, assembly language, C/C++, Java, Python, Visual Basic, etc.

Descriptions of the program instruction, Motion Request (TYPE):

TABLE 2

| TYPE | Instruction Code | Description |
|---|---|---|
| RESET | IN-1 | Reset (initial posture) |
| Nod | IN-2 | Nod |
| Smile | IN-3 | Smile |
| Turn Left | IN-4 | Turn left |
| Turn Right | IN-5 | Turn right |
| DEAL (1st Banker) | IN-6 | Deal a poker card to the banker in the first round. |
| DEAL (2nd Banker) | IN-7 | Deal a poker card to the banker in the second round. |
| DEAL (3rd Banker) | IN-8 | Deal a poker card to the banker in the third round. |
| DEAL (1st Player) | IN-9 | Deal a poker card to the player in the first round. |
| DEAL (2nd Player) | IN-10 | Deal a poker card to the player in the second round. |
| DEAL (3rd Player) | IN-11 | Deal a poker card to the player in the third round. |
| Collect Cards (release) | IN-12 | Retrieve poker cards: Release poker cards 321. |
| Collect Cards (recycle) | IN-13 | Retrieve poker cards: Activate the electric conveyer belt 351. |
| Emergency Stop | IN-13 | Emergency stop |

Descriptions of two columns for poker cards:

TABLE 3

| Suit | Value |
|---|---|
| Spade, Heart, Diamond and Club | A, 2, 3, 4, 5, 6, 7, 8, 9, 10, J, Q and K |

Figure 6:
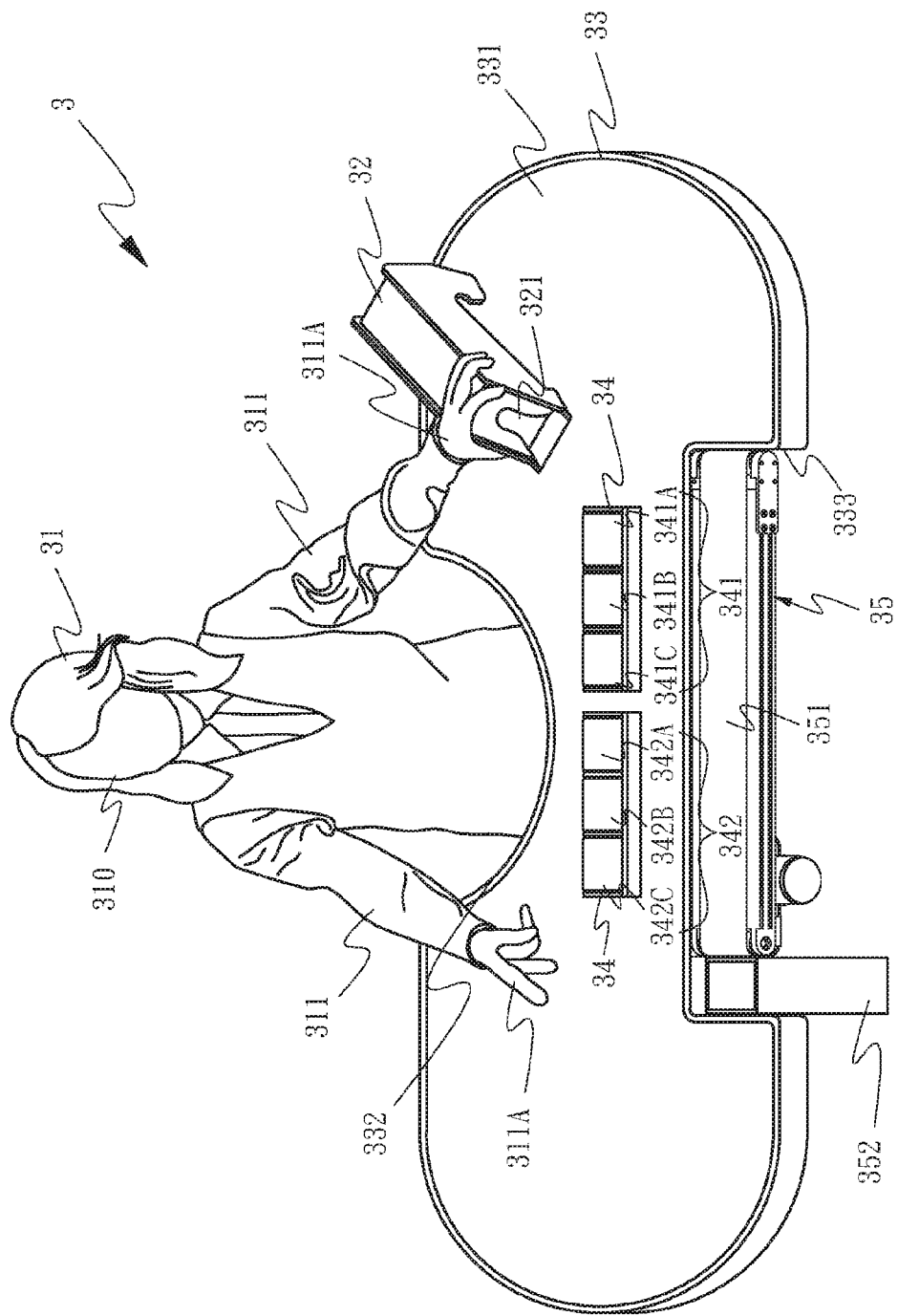
FIG. 6 is a structural diagram of a dealing robot in another embodiment.

Referring to FIG. 6, which is a structural diagram of the dealing robot device 3 in another embodiment. As shown in the block diagram in FIG. 1, the dealing robot device 3 comprises a humanoid robot 31, an electric card shelf 34 and a retrieving device 35. The humanoid robot 31 and the retrieving device 35 are adjacent to the table 33; the card shoe 32 and the electric card shelf 34 are placed on a desktop 331 of the table 33. In another embodiment, the table 33 comprises a first concave area 332 and a second concave area 333, both of which concave from table edges to the table center and are opposite to each other. In another embodiment, the humanoid robot 31 and the retrieving device 35 are placed in the first concave area 332 and the second concave area 333, respectively.

A poker card acquiring portion 311A defined at one end of the robotic arm 311 of the humanoid robot 31 can be an electric gripper or an electric sucker by which a poker card 321 at an outlet of the card shoe 32 is fetched. The electric card shelf 34 is divided into a banker poker card placement area 341 and a player poker card placement area 342. The banker poker card placement area 341 is further divided into a first-round placement area 341A, a second-round placement area 341B and a third-round placement area 341C; the player poker card placement area 342 is further divided into a first-round placement area 342A, a second-round placement area 342B and a third-round placement area 342C.

Figure 7:
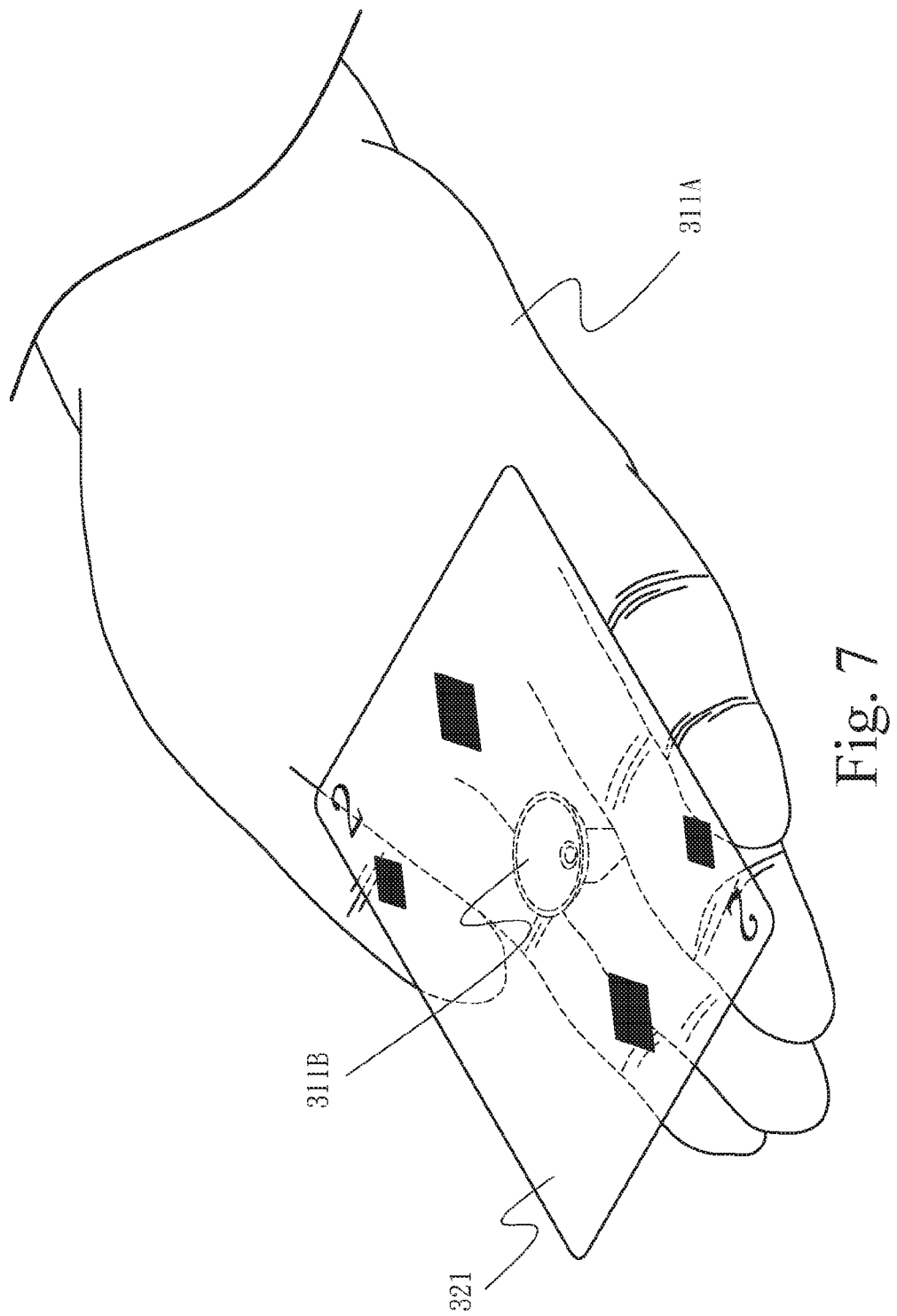
FIG. 7 is a schematic view which illustrates a poker card acquiring portion of a dealing robot in another embodiment.

Referring to FIG. 7, which illustrates the poker card acquiring portion 311A further comprises an electric sucker 311B in another embodiment. The electric sucker 311B has a control port electrically connected to the controller 302 and is regulated by the controller 302 during fetch of a poker card.

Figure 8:
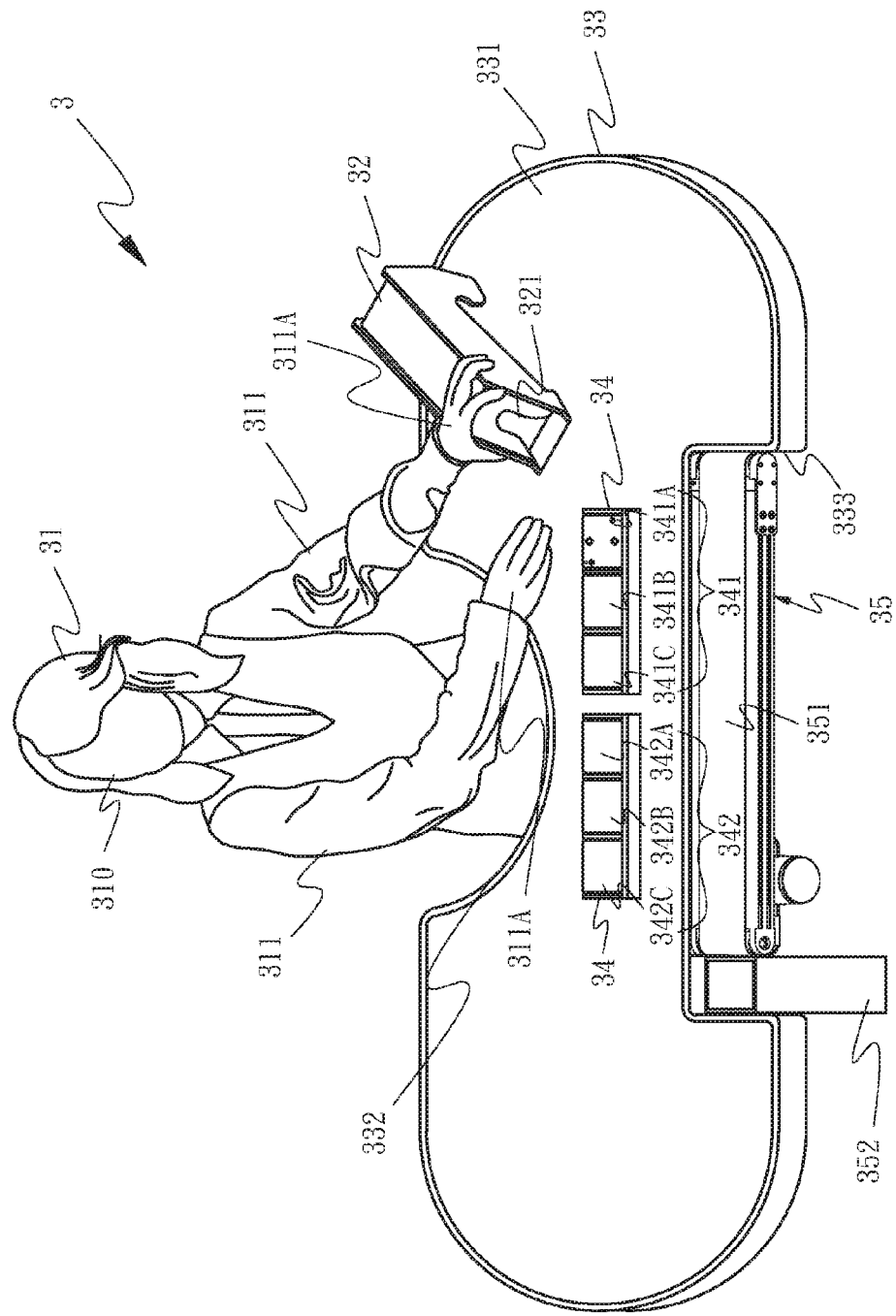
FIG. 8 is a schematic view of a running dealing robot.

Referring to FIG. 8, which illustrates the controller 302 obeys an instruction listed in Table 2 for operation when the instruction from the control-side second communication interface 23 is received by a dealing-side communication interface 301. In the case of "Type" of an instruction, "DEAL (1st Banker)" for example, a microprocessor fetches the instruction, "IN-6", and executes "Deal a poker card to the banker in the first round". The steps for execution are shown from M101 to M105:

M101: Instruct the poker card acquiring portion 311A of the robotic arm 311 to move to P1(x1, y1, z1), the outlet of the card shoe 32.

M102: Instruct the poker card acquiring portion 311A to fetch a poker card 321.

M103: Instruct the poker card acquiring portion 311A of the robotic arm 311 to move to P2(x2, y2, z2), the first placement area of the banker poker card placement area.

M104: Instruct the poker card acquiring portion 311A to release the poker card 321.

M105: Instruct the robotic arm 311 to move to an initial position.

The abovementioned robot may follow a straight path or a fitted-curve path (which imitates movement of a human being's arm) between the two positions, P1 and P2. In another embodiment, the controller 302 further instructs the robotic arm 311 to download humanoid motion settings during movement between the two positions, P1 and P2, and express humanoid postures based on fitted-curve movement rather than straight movement. The abovementioned fitted curve is created according to movement of a real person's arms during dealing.

Figure 9:
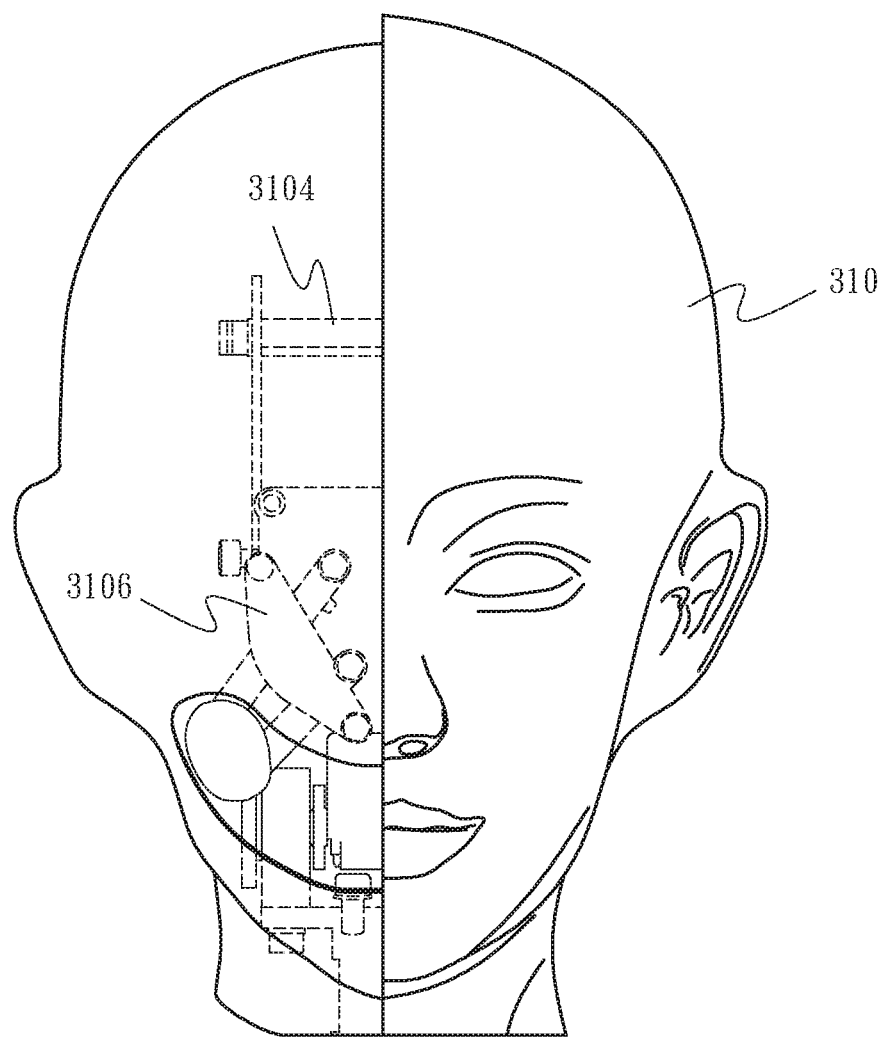
FIG. 9 through FIG. 11 are schematic views which illustrate a structures of a dealing robot's head in another embodiment.
Figure 10:
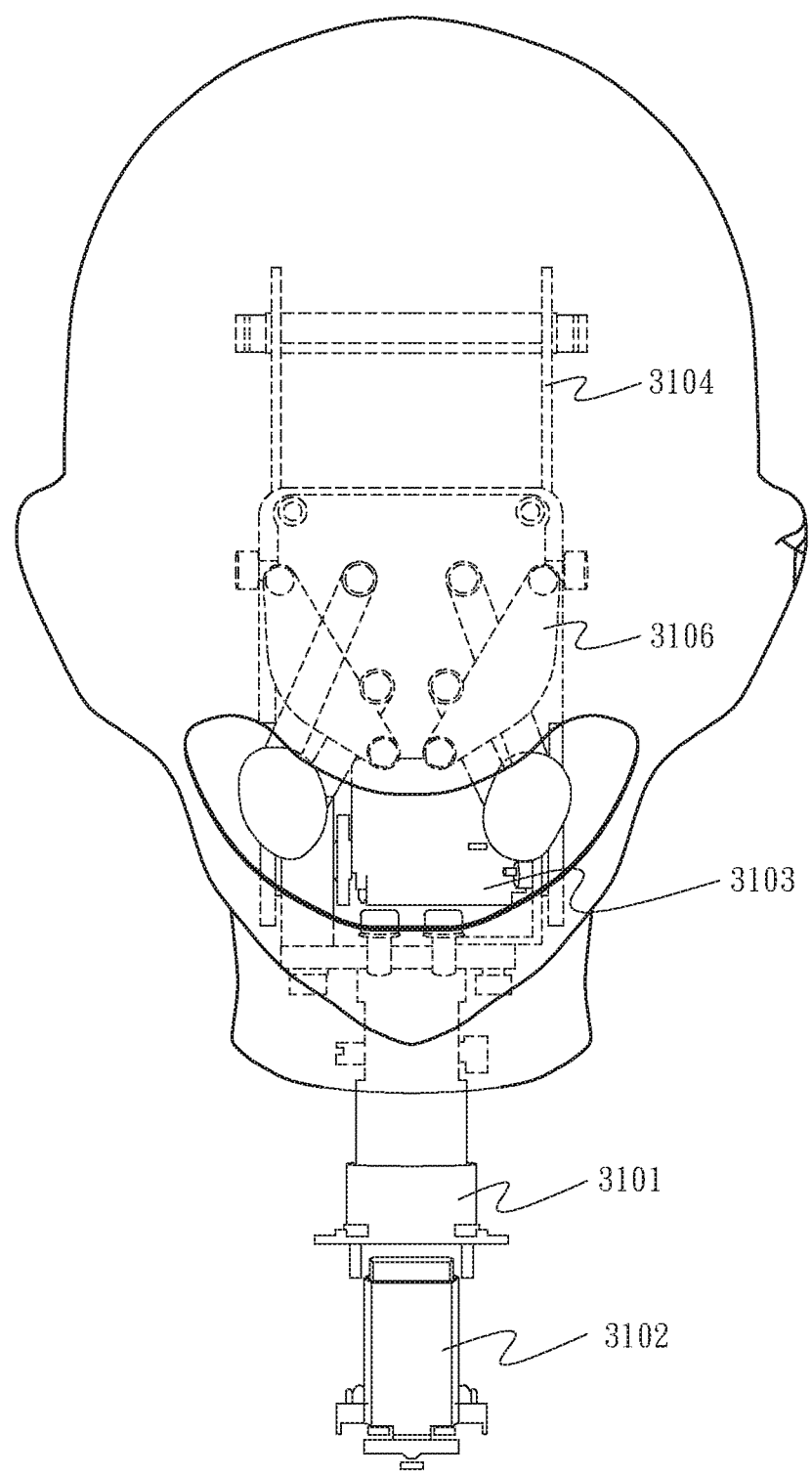
Figure 11:
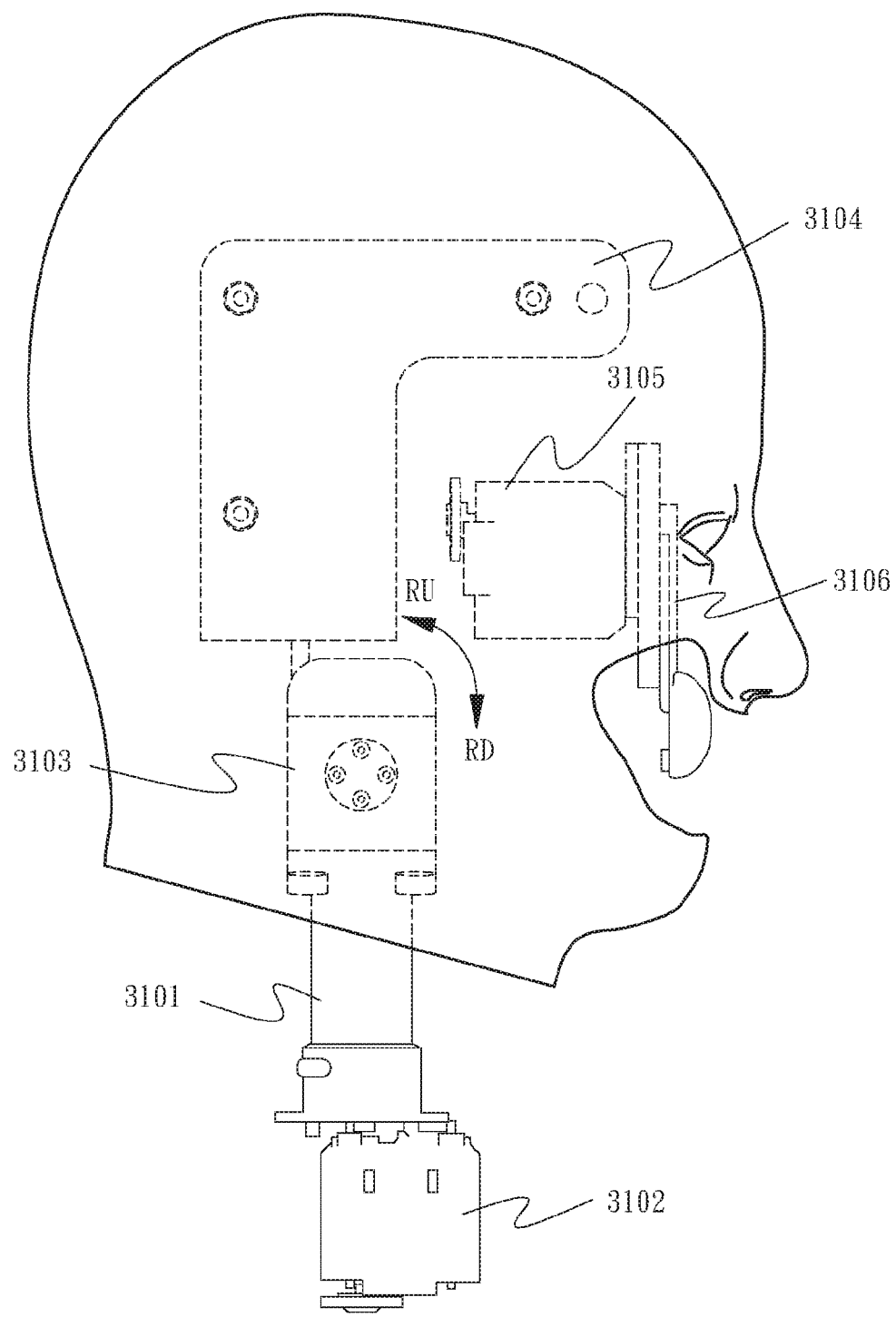

Referring to FIG. 9 through FIG. 11, which are perspective views illustrating head structure of the humanoid robot 31. In order to simulate a real person's expressions, the humanoid robot 31 of the dealing robot 1 is further provided with a neck brace 3101, a neck motor 3102, a head motor 3103, a head brace 3104, a face motor 3105 and an actuation linkage 3106 in a head. The face 310 is made of plastic material such as silicone. The neck brace 3101 has both ends to link an output terminal of the neck motor 3102 and the body of the head motor 3103, respectively. The head brace 3104 has both ends to link an output terminal of the head motor 3103 and internal structure of the head, respectively. The face motor 3105 is optionally fixed at internal structure of the head or the head brace 3104; the face motor 3105 allows the output terminal to link one end of the actuation linkage 3106 which has the other end optionally linking each position inside the face 310 including, without limitation, eyes' inner surface, mouth's inner surface, forehead's inner surface, etc. The neck motor 3102, the head motor 3103 and the face motor 3105 are electrically connected to the controller 302. The controller 302 which downloaded motion settings simulating a real person is able to instruct each motor to perform a specific motion. The motions simulating a real person include, without limitation, those motions as shown in Table 4:

TABLE 4

Humanoid motion settings

| Motion | Instruction | Instruction content/movement executed by a motor |
| --- | --- | --- |
| Shake head | PM1 | The head driven by the neck motor 3102 turns left and right (RL↔RR). |
| Turn left | PM2 | The head driven by the neck motor 3102 turns left (RL). |
| Turn right | PM3 | The head driven by the neck motor 3102 turns right (RR). |
| Nod | PM4 | The head driven by the head motor 3103 nods up and down (RU↔RD). |
| Raise head | PM5 | The head driven by the head motor 3103 turns upward (RU). |
| Lower head | PM6 | The head driven by the head motor 3103 turns downward (RD). |
| Smile | PM7 | The face driven by the face motor 3105 smiles. |

Figure 12:
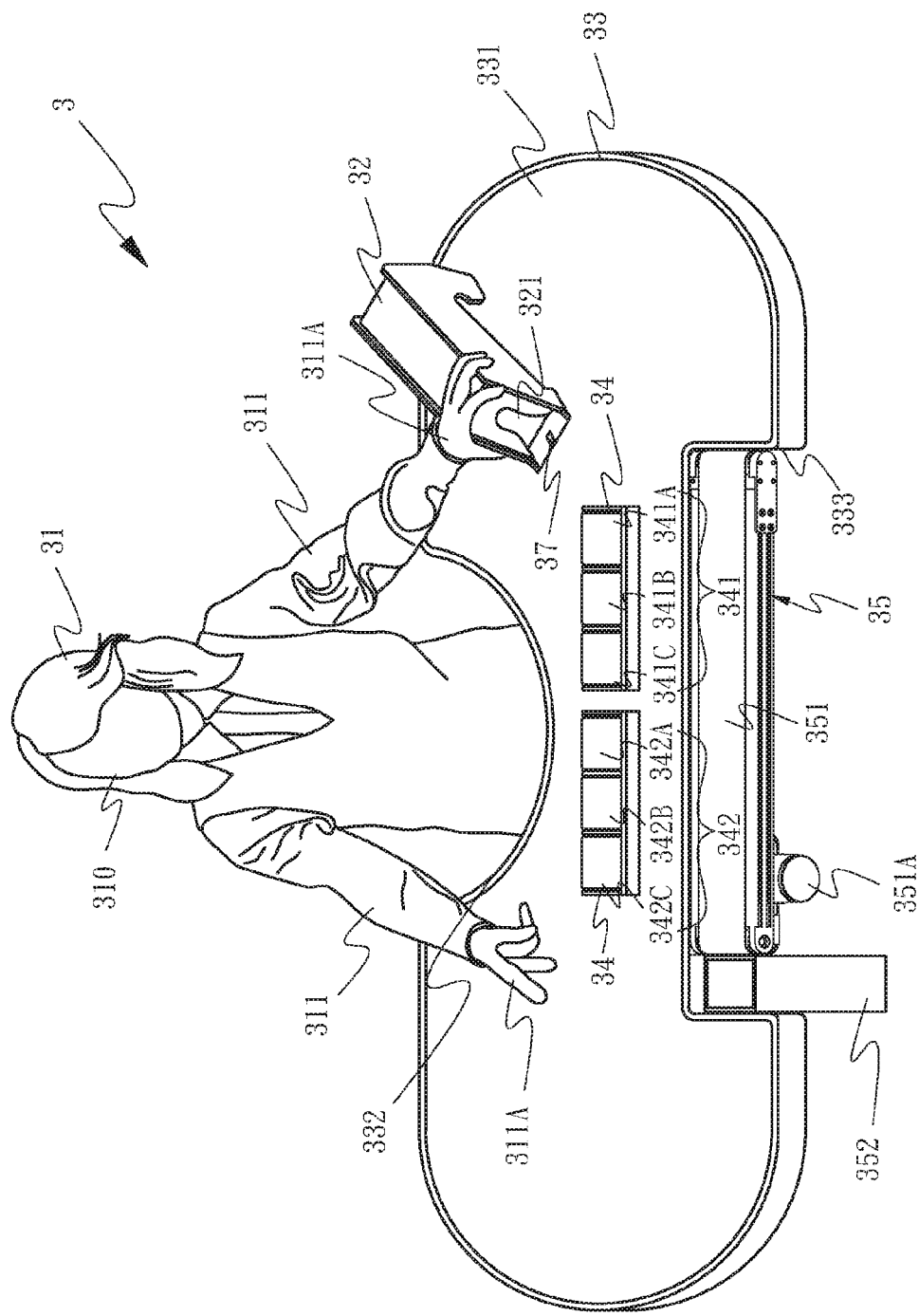
FIG. 12 is a schematic view of an image acquiring module in another embodiment.
Figure 13:
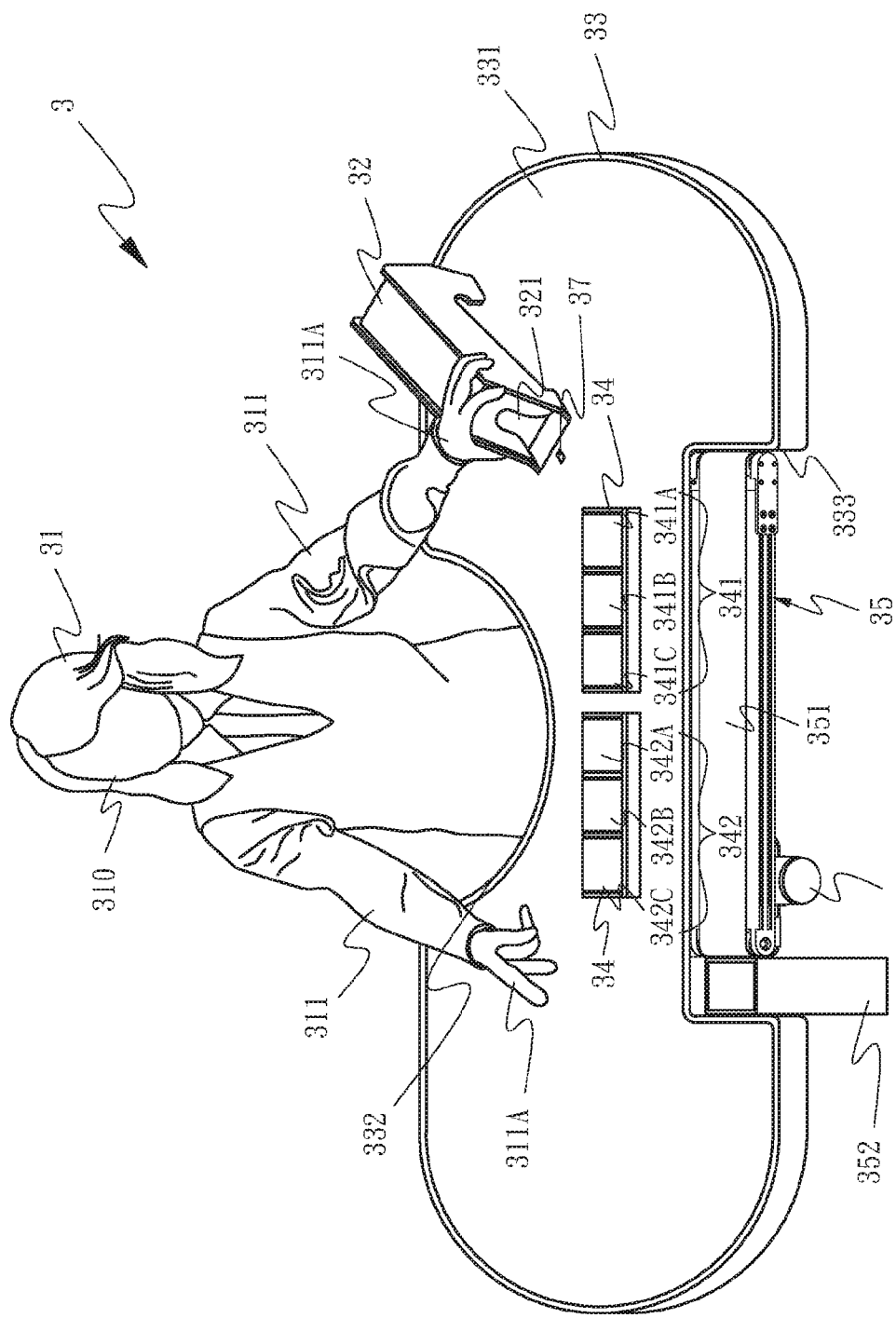
FIG. 13 is a schematic view of an image acquiring module in a further embodiment.

Referring to FIG. 12 through FIG. 13, which illustrate the dealing robot device 3 further comprises an image acquiring module 37 electrically connected to the controller 302 in another embodiment. The image acquiring module 37 is adjacent to an outlet of the card shoe 32. As shown in FIG. 12, the image acquiring module 37 in the embodiment is situated on the card shoe 32 and adjacent to an outlet of the card shoe 32. Alternatively, the image acquiring module 37 is situated on the table 33 and adjacent to an outlet of the card shoe 32, as shown in the embodiment in FIG. 13. The image acquiring module 37 comprises a photographic lens, a sensor, a flashlight and image control circuits (not shown in the figure) connected to the photographic lens, the sensor and the flashlight. The abovementioned sensor, which is used to sense a poker card passing through the image acquiring module, can be one of the following components including photo sensor (photo coupler, solar panel, etc.) and distance detector (ultrasonic detector, radar detector, etc.). When a signal (for example, photo-interrupt signal, distance-change signal, etc.) from the sensor through which a poker card 321 fetched by the dealing robot device 3 passes is transmitted to the image control circuits, the photographic lens is driven to take a photo of a poker card's front face and the image control circuits, which measures light intensity on a poker card, determines to activate the flashlight synchronously. As such, real-time information of a poker card's front face is captured by the image control circuits and transmitted to the controller 302 after the poker card 321 is removed from the card shoe 32 by the dealing robot device 3.

The retrieving device 35 further comprises an electric conveyer belt 351 and a retrieving box 352. The electric conveyer belt 351 installed at a position opposite to the electric card shelf 34 is situated below the electric card shelf 34 and used to receive poker cards 321 from the electric card shelf 34. The retrieving box 352 has an opening which is opposite to one or two ends of the electric conveyer belt 351 and used to retrieve poker cards 321 carried on the running electric conveyer belt 351. The controller 302 links a conveyer motor 351A of the electric conveyer belt 351. The conveyer motor 351A, which is activated when receiving an instruction from the controller 302, drives the conveyer to operate.

Figure 14:
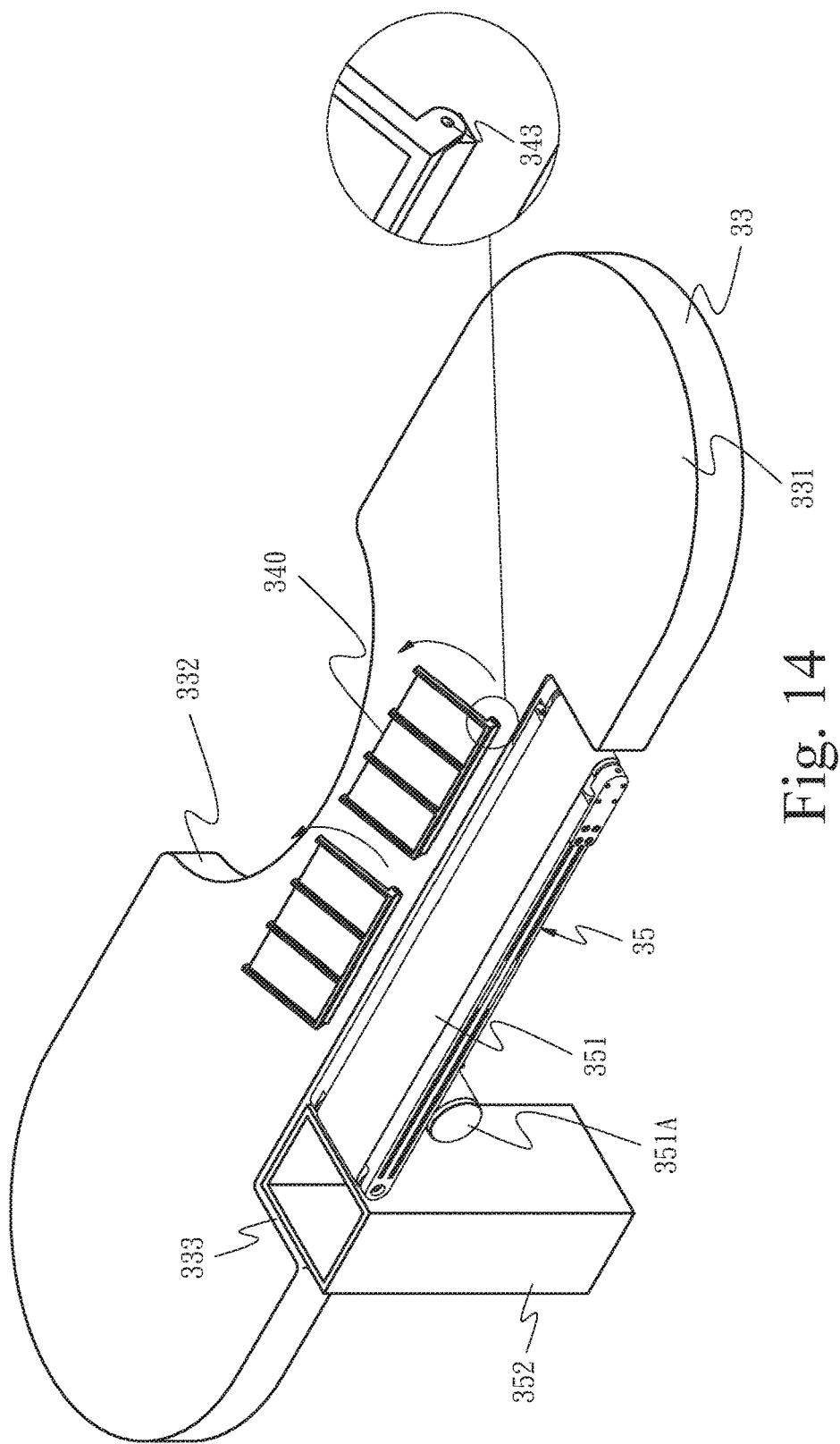
FIG. 14 is a schematic view of an electric card shelf in another embodiment.

Referring to FIG. 14, which illustrates the electric card shelf 34 comprises a panel board 340 and a shelf motor 343 in another embodiment wherein the shelf motor 343 and its output terminal are connected to the desktop 331 of the table 33 and the bottom of the panel board 340, respectively. The shelf motor 343, which has a control port linking the controller 302, is activated with retrieving instruction information from the controller 302 accepted and the panel board 340, which is movable with respect to the table 33, releases poker cards 321 from the electric card shelf 34 in a dump mode, as shown in the right-hand side of the electric card shelf 34 in FIG. 16.

Figure 15:
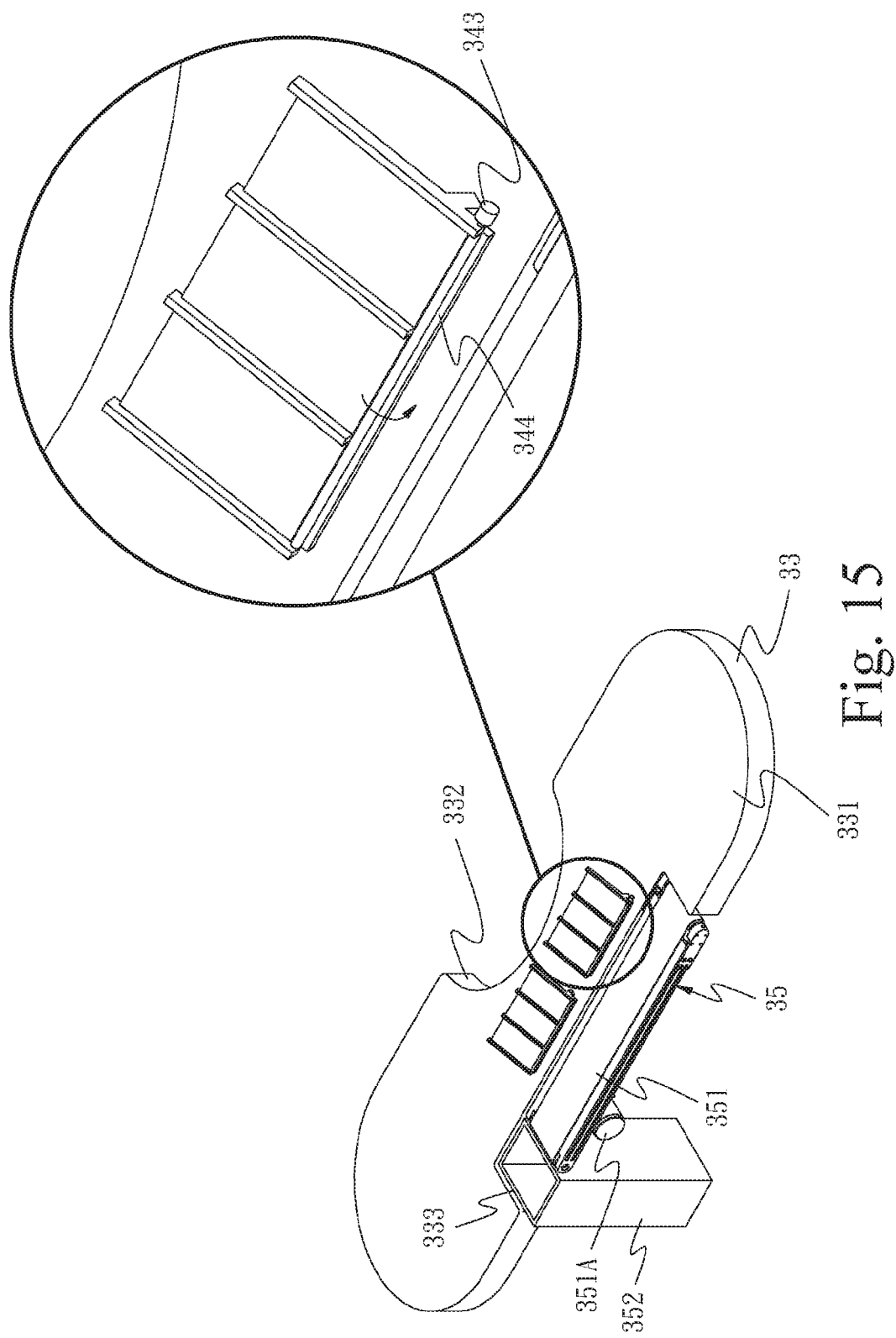
FIG. 15 is a schematic view of an electric card shelf in a further embodiment.

Referring to FIG. 15, which illustrates the electric card shelf 34 comprises the panel board 340, the shelf motor 343 and the bottom board 344 in another embodiment. The panel board 340 forms an angle of inclination (for example, acute angle) with respect to the table 33. The shelf motor 343 and its output terminal are connected to the bottom of the panel board 340 and one side of the bottom board 344, respectively. When the shelf motor 343 is activated for "closing", the bottom board 344 and the panel board 340 form an L-shaped structure by which poker cards 321 are kept on the panel board 340; when the shelf motor 343 is activated for "opening", the bottom board 344 revolves to form an obtuse angle with respect to the panel board 340 or revolves until an identical plane so that poker cards 321 held in the electric card shelf 34 are released in a slip mode, as shown in the left-hand side of the electric card shelf 34 in FIG. 16.

Figure 17:
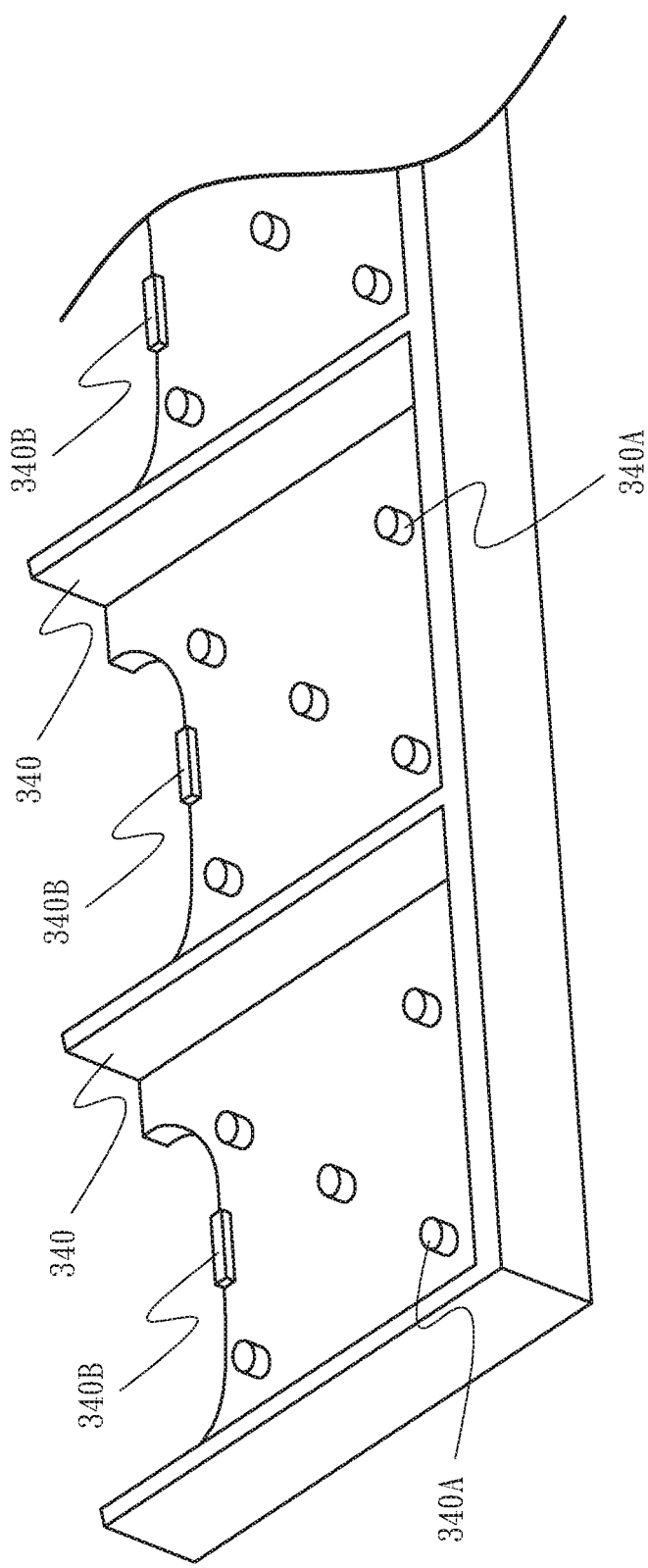
FIG. 17 is a schematic view which illustrates a structure of a panel board in another embodiment.

Referring to FIG. 17, which illustrates the panel board 340 is equipped with concave structures 340A, convex structures 340B, or a combination thereof in another embodiment. As such, the electric card shelf 34 from which poker cards 321 are released prevents the poker cards 321 from effect of electrostatic adherence to the panel board 340.

Figure 16:
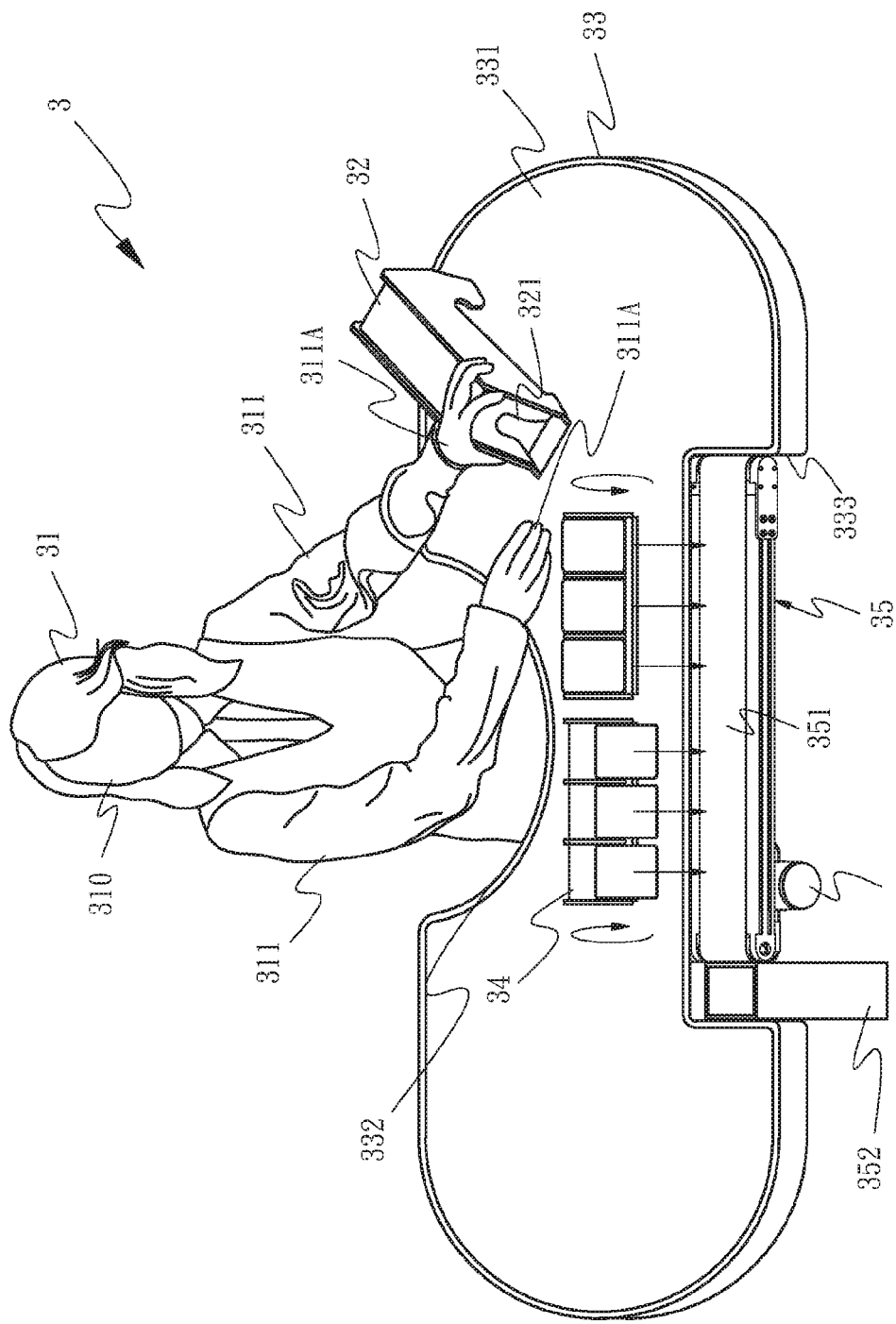
FIG. 16 is a schematic view of an electric card shelf running in yet another embodiment.

Referring to FIG. 16, which illustrates the controller 302 executes the following steps (M111~M112) when an instruction code is "IN-12", Retrieve poker cards: Release poker cards 321:

M111: Instruct the shelf motor 343 to run and release poker cards 321 from the panel board 340 to a conveyer belt (dump mode/slip mode).

M112: Instruct the shelf motor 343 to run reversely and return the panel board 340 or the bottom board 344 to an initial position.

When the microprocessor which has executed an instruction code, IN-12, further executes another instruction code, IN-13 (Retrieve poker cards: Activate the electric conveyer belt 351), after default time, the poker cards 321 on the electric conveyer belt 351 can be conveyed to the retrieving box 352.

Figure 18:
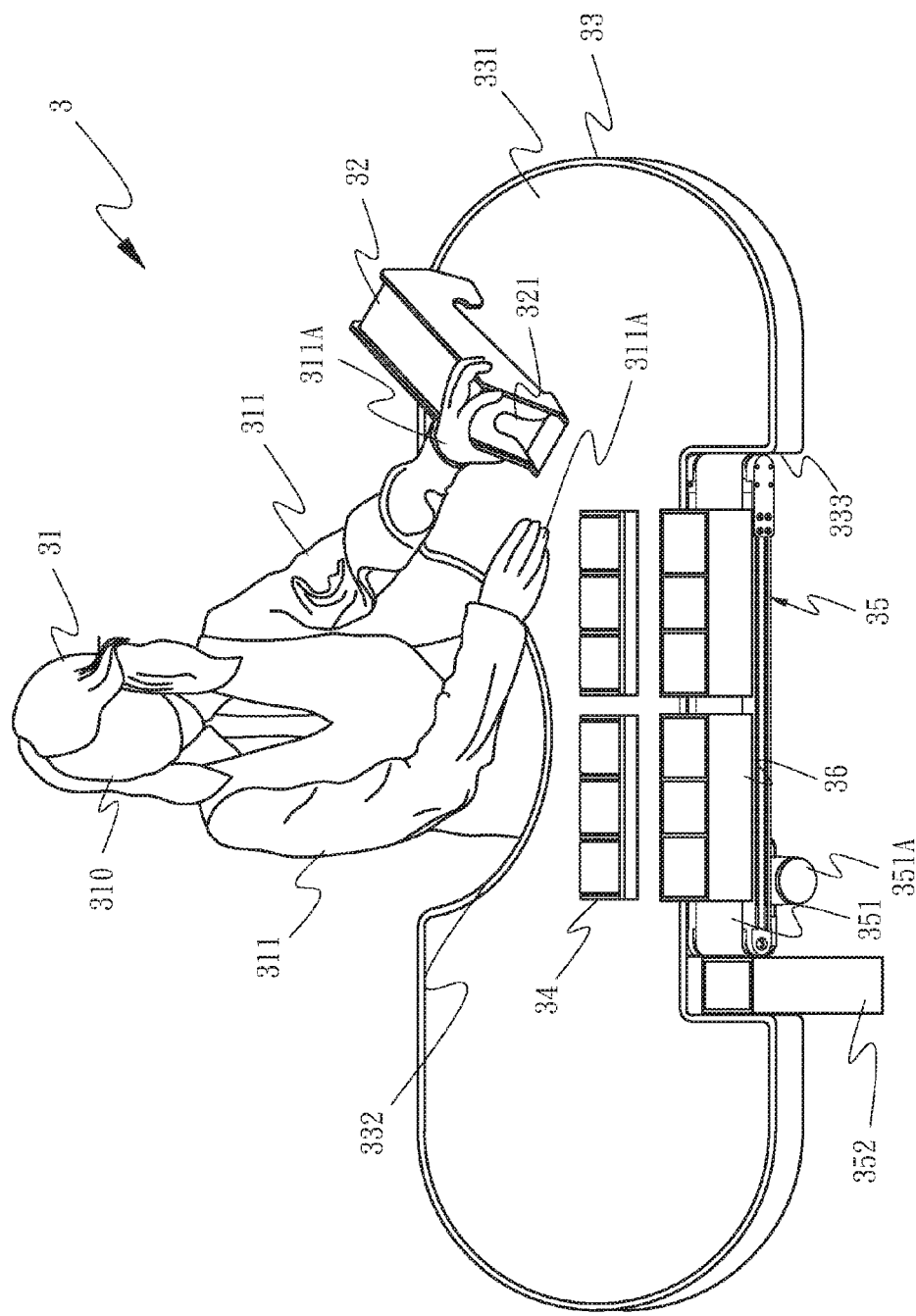
FIG. 18 is a schematic view which illustrates a structure of a retrieving frame in another embodiment.
Figure 19:
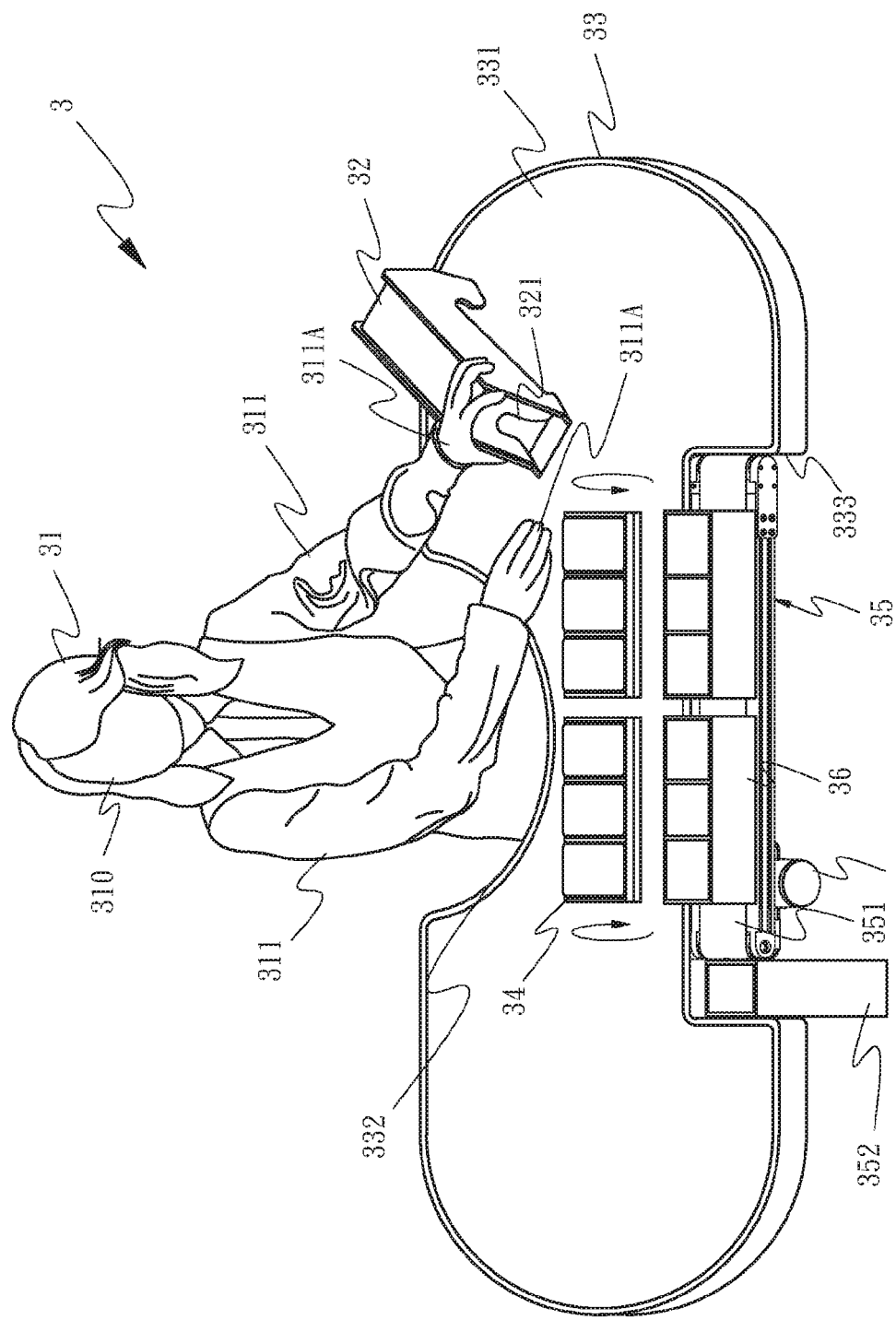
FIG. 19 through FIG. 21 are schematic views which illustrate a retrieving frame running in a further embodiment.
Figure 20:
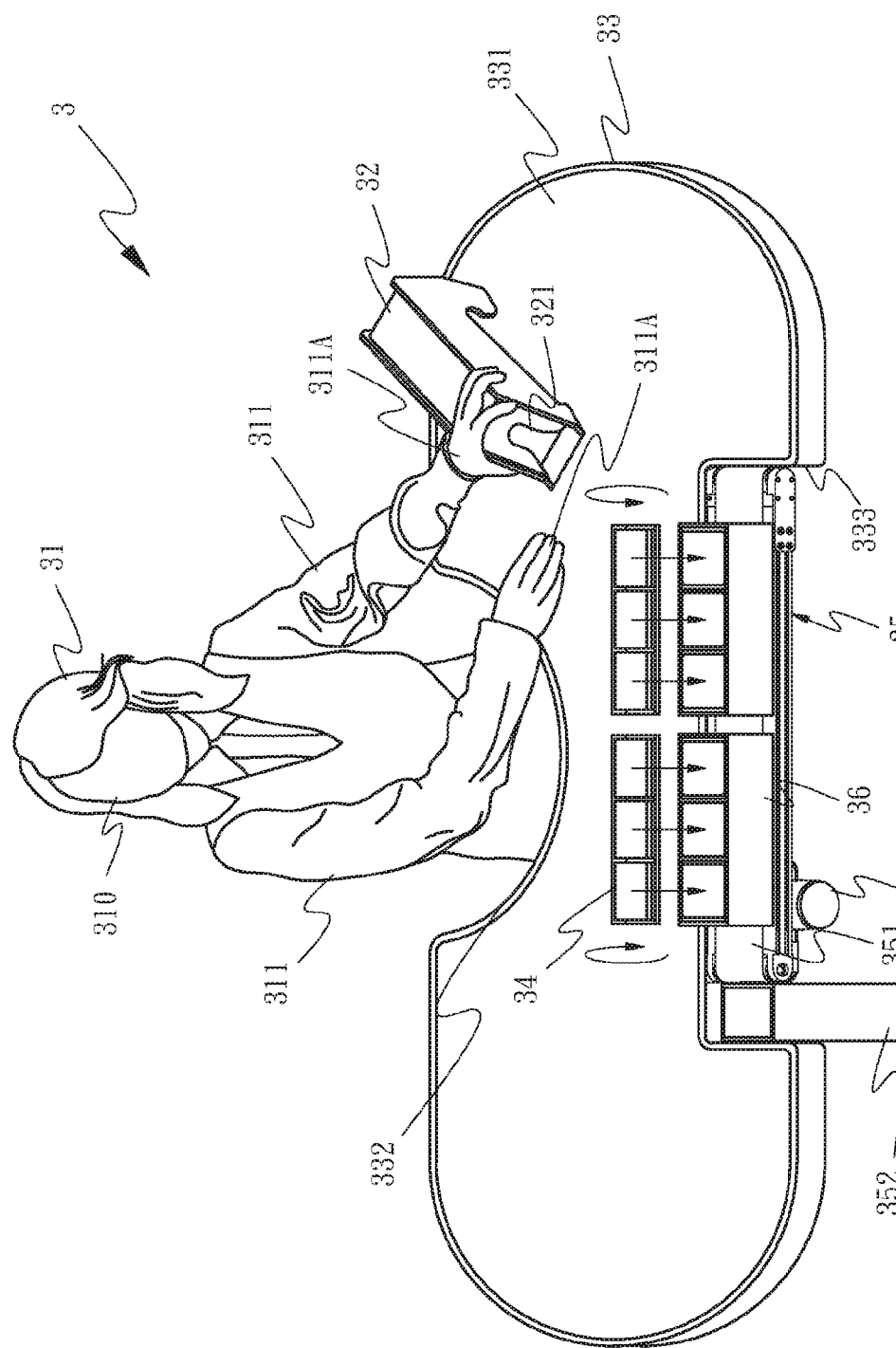

Referring to FIG. 18 through FIG. 20, which illustrate the electric card shelf 34 and the electric conveyer belt 351 in another embodiment comprise a retrieving frame 36 in between wherein the retrieving frame 36 has a side wall linking an edge of the table 33 and the electric conveyer belt 351 excludes its both sides (conveyer belt) from a revolving body. The retrieving frame 36 further comprises a plurality of frame spaces, each of which is opposite to a placement area (341A-341C or 342A-342C). As such, the released poker cards 321 correctly fall on the electric conveyer belt 351 through the frame spaces.

Figure 21:
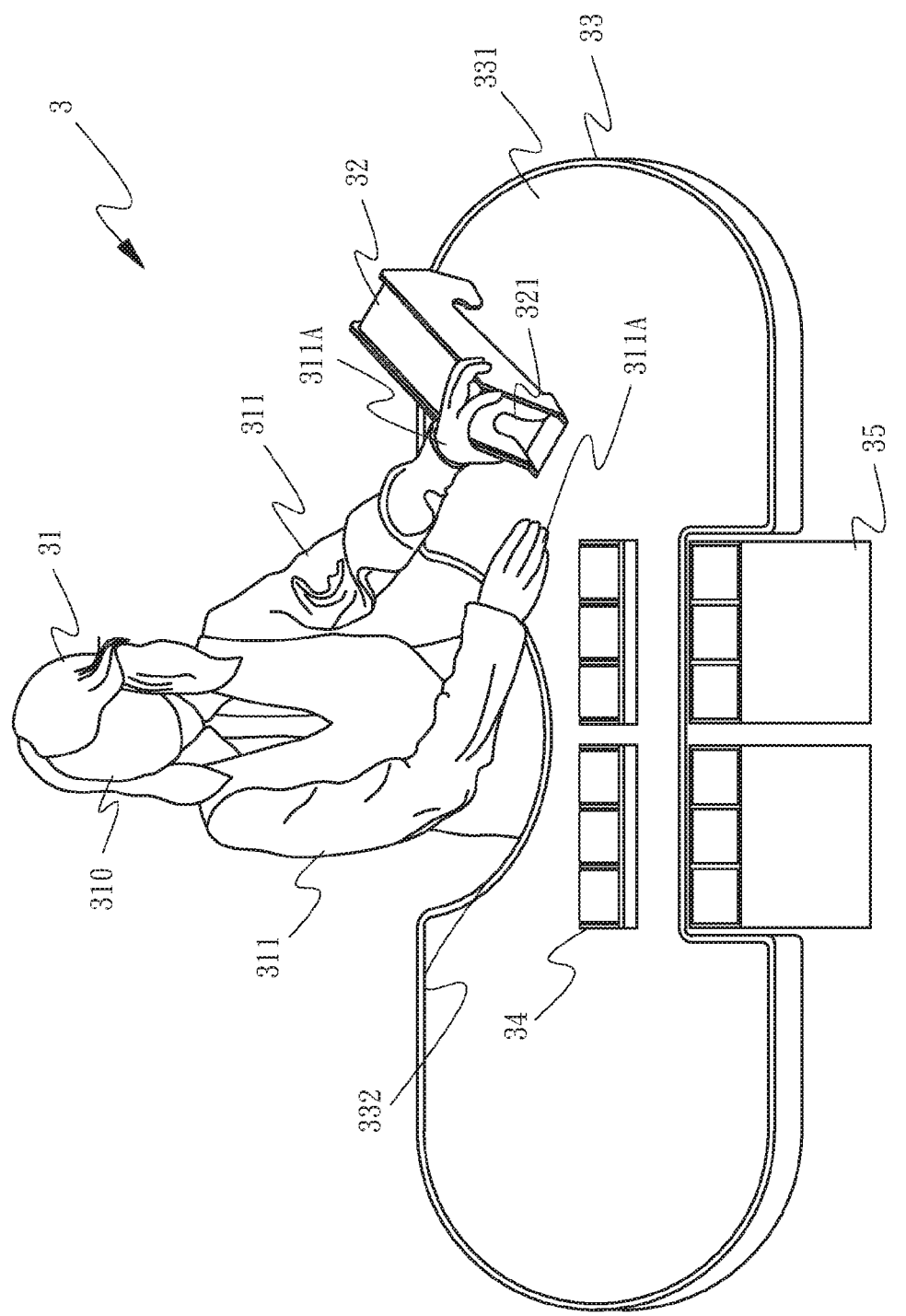

Referring to FIG. 21, which illustrates the retrieving device 35 is a retrieving container in another embodiment. The retrieving container, which is adjacent to and situated below the electric card shelf 34, has an opening opposite to placement areas of the electric card shelf 34 and used to receive the poker cards 321 from the electric card shelf 34.

Figure 22:
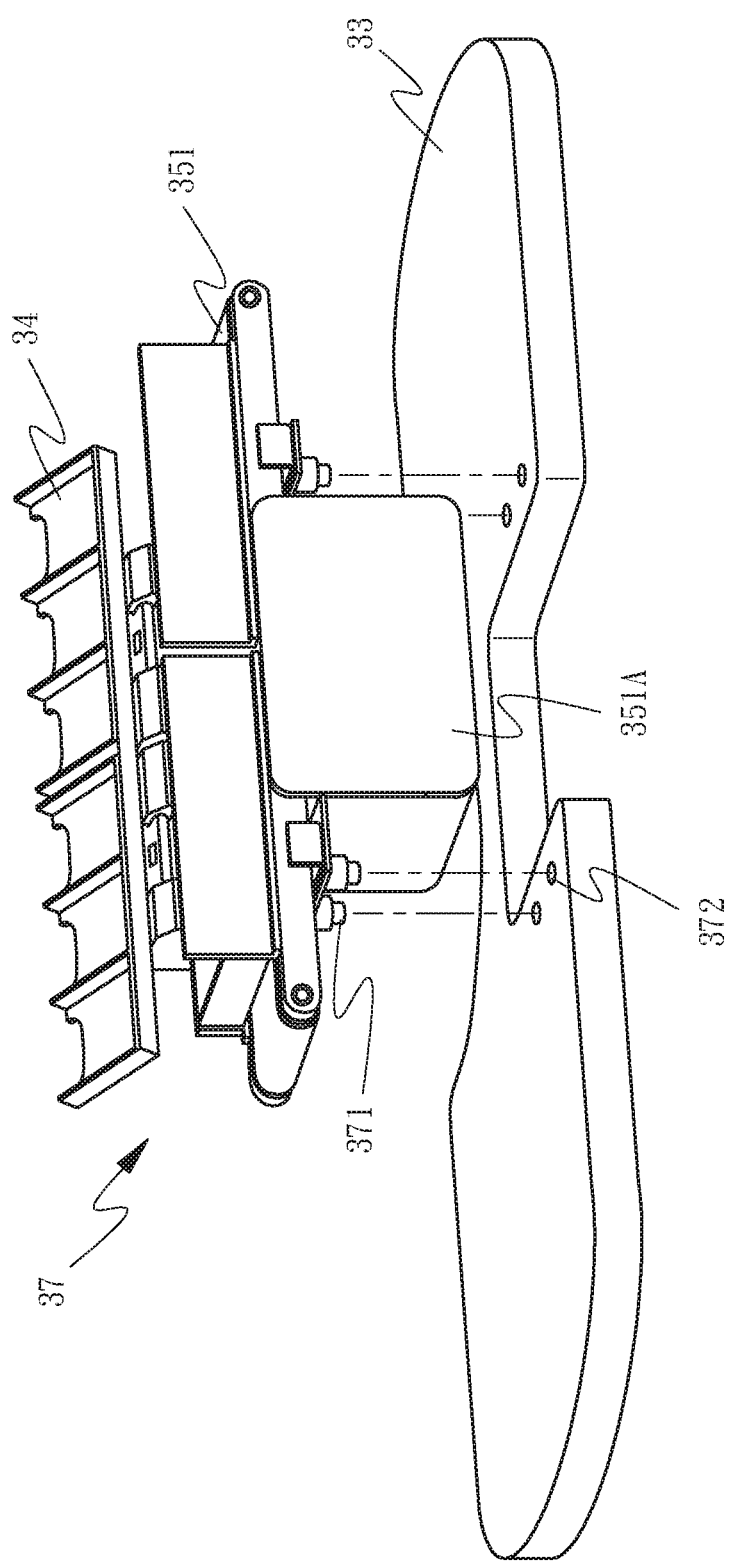
FIG. 22 is a schematic view of a quick release assembly in another embodiment.

Referring to FIG. 22, which illustrates the electric card shelf 34, the electric conveyer belt 351 and the conveyer motor 351A constitute a quick release assembly 37 in another embodiment. The quick release assembly 37 is movably embedded into the table 33. On the quick release assembly 37 and the table 33 are designed some quick release fittings (pin members 371 and pin holes 372): the pin members 371 are located on the quick release assembly 37; the pin holes 372 are opened on the table 33 and used to hold the pin members 371. Alternatively, the pin members 371 and the pin holes 372 can be designed on the table 33 and the quick release assembly 37, respectively. The quick release fittings are not limited to the model herein.

Figure 23:
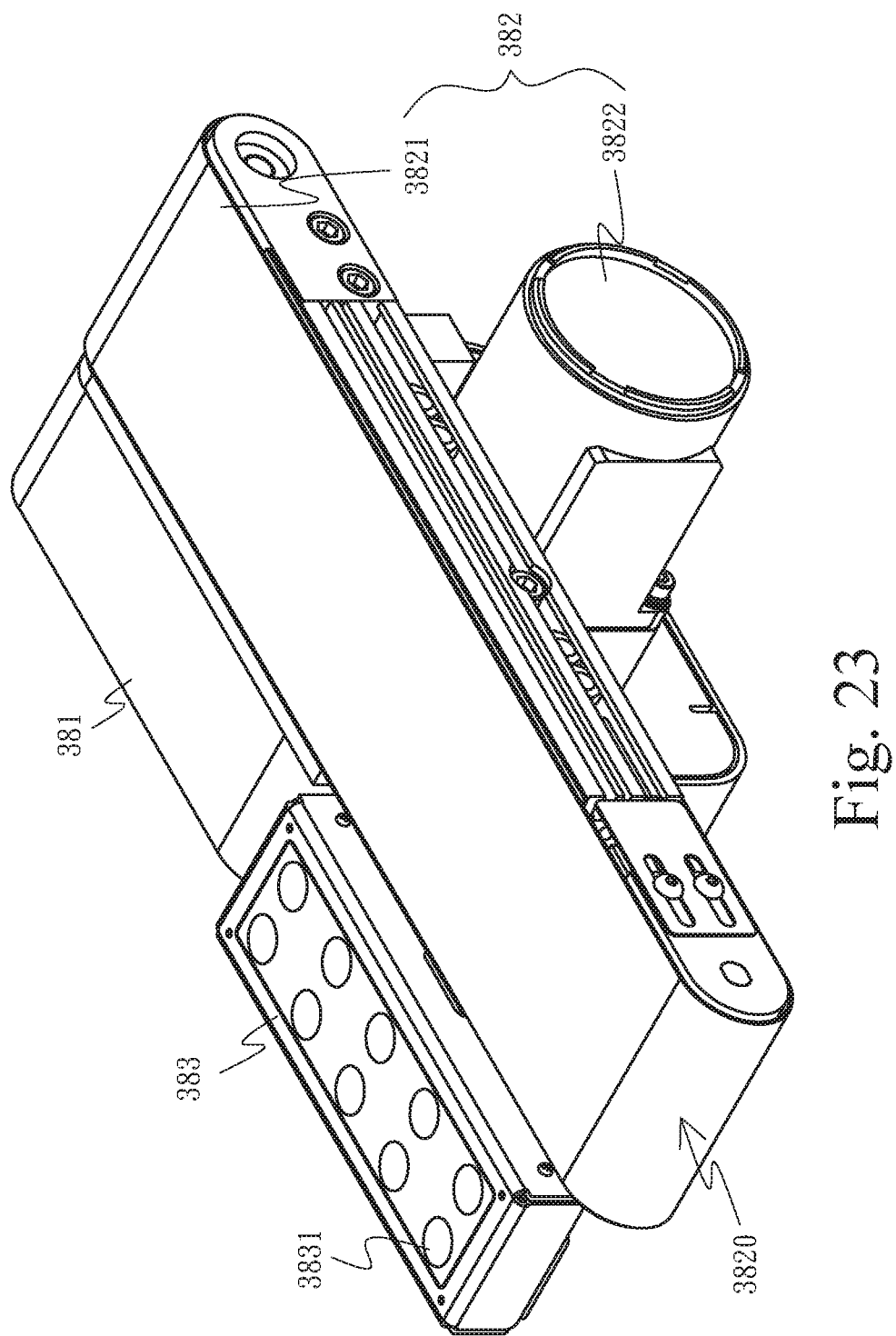
FIGS. 23 and 24 are schematic views which illustrate a poker card abandoning kit in another embodiment.
Figure 24:
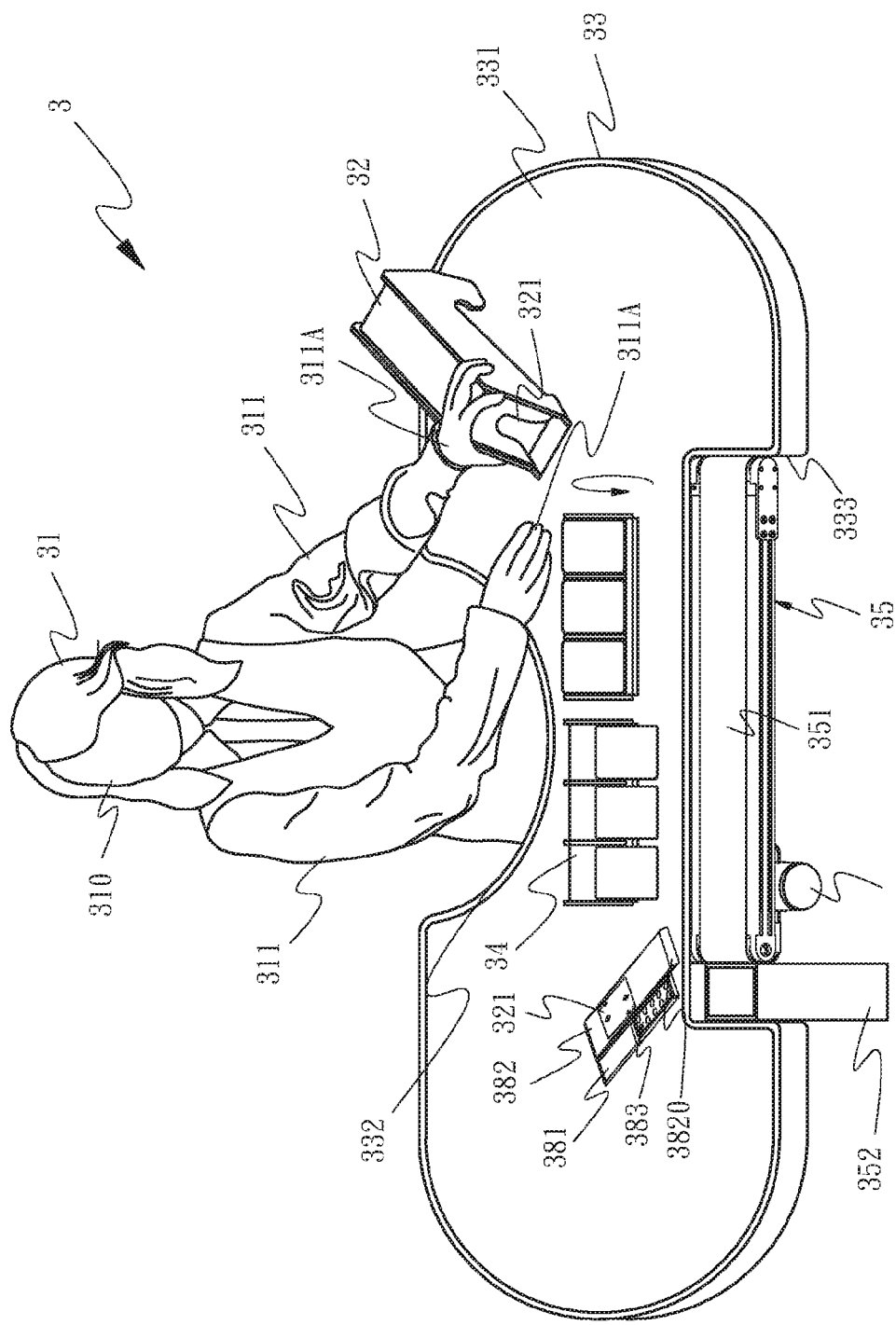

Referring to FIGS. 23 and 24, which illustrate a dealing robot device 3 further comprises a poker card abandoning kit 38 on the table 33 in another embodiment. The poker card abandoning kit 38 comprises a controlling circuit 381, a conveyer kit 382 and a displayer 383. The controlling circuit 381 is electrically connected to the conveyer kit 382, the displayer 383 and the controller 302. The conveyer kit 382 comprises a conveyer 3821 and a motor 3822 driving the conveyer 3821. The motor 3822 has a rotating end, which links and drives the conveyer 3821, and a controlling end connected to the controlling circuit 381; as such, the controlling circuit 381 enables the motor 3822 to drive the conveyer 3821.

The conveyer kit 382 has a conveyer end 3820 over the retrieving device 35 (for example, over the opening of the retrieving box 352 or the electric conveyer belt 351) for delivering poker cards abandoned on the conveyer 3821 to the retrieving device 35.

The controller 302, which has received an abandon instruction for poker cards from the dealing control device 2, drives the robotic arm 311 to fetch one or more poker cards 321 from the card shoe 32 and move to an abandoning place (for example, over the conveyer 382) and further drives the displayer 383 directly or through the controlling circuit 381 for displaying the number of the abandoned poker cards.

In the embodiment, the displayer 38 is a Light-Emitting Diode (LED) displayer with three LED indicators 3831 enabled by the controlling circuit 381 in the case of throwing three poker cards according to an abandoning instruction. Moreover, as a display screen, the displayer 382, which is activated by the controlling circuit 381, demonstrates the digit "3" or a symbol or an icon representing the digit "3".

The controlling circuit 381, which has received a retrieving instruction from the controller 302 or the dealing control device 2, drives the motor 3822 of the conveyer 382 for delivery of the poker cards 321 from the conveyer 3821 to the retrieving device 35.

The controlling circuit 381 comprises an arithmetic processing circuit (for example, computer, microprocessor chip, programmable digital circuit, etc.) and a drive circuit for driving both the motor 3822 of the conveyer 382 and the displayer 383.

With a single card shoe supported, a dealing robot device which serves one group of players only takes some time to wait information such as game progress and statistics announced between two rounds of games such that the other group of players, who are players of a new round of poker game, have to await these results related to the previous round of poker game played by the former group of players and even opt out of a gambling party after losing patience. In order to reduce waiting time between two rounds of games and speed up gambles, a dealing robot device available to an online reality poker game in the present disclosure is supported with dual card shoes by which two groups of players for previous and next gambling parties wait less transition time but experience a smooth poker game in each round.

As shown in FIG. 1, when the result of a round of game, that is, information of a winner (banker or player) or a drawn game, is decided by the dealing control device 2 or a terminal device regulating the dealing control device 2 according to estimated values of poker cards dealt to the banker and the first group of players playing an online reality poker game, the controller 302 executes a retrieving instruction to drive the conveyer kit 382 directly or through the controlling circuit 381 and recollect poker cards 321 abandoned on the conveyer kit 382. At the same time, the game progress and statistics are displayed to the first group of players by a dealing robot under support of dual card shoes; a new round of game is enabled for the second group of players, as shown in the following embodiment for a transition of card shoes which consist of a first card shoe 322 and a second card shoe 323. Furthermore, another round of game is enabled for the first group of players again when the second group of players who finished a poker game are watching the game progress and statistics. As such, the game efficiency is promoted because poker games without a time difference are experienced by two groups of players.

Figure 25:
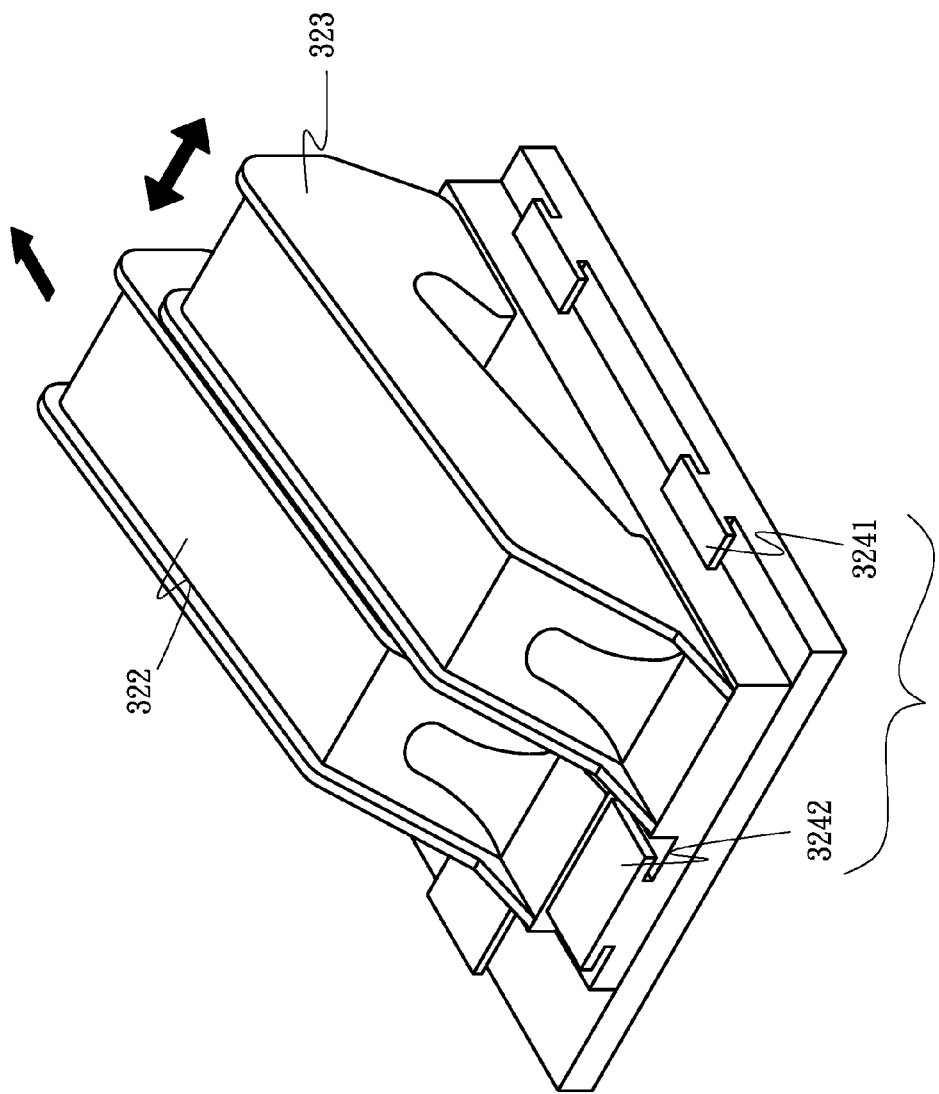
FIG. 25 is a structural schematic view of a first shift device in an embodiment.

Referring to FIG. 25, which illustrates the first card shoe 322 as well as the second card shoe 323 abreast mounted over a first shift device 324 and a first shift units 3241 as well as a second shift unit 3242 are designed around the first card shoe 322, the second card shoe 323 and the first shift device 324 wherein the first shift unit 3241 enables both the first card shoe 322 and the second card shoe 323 to be transferred on the first shift device 324 freely and the second shift unit 3242 allows the first card shoe 322 to be transferred on the first shift device 324 back and forth.

Figure 26:
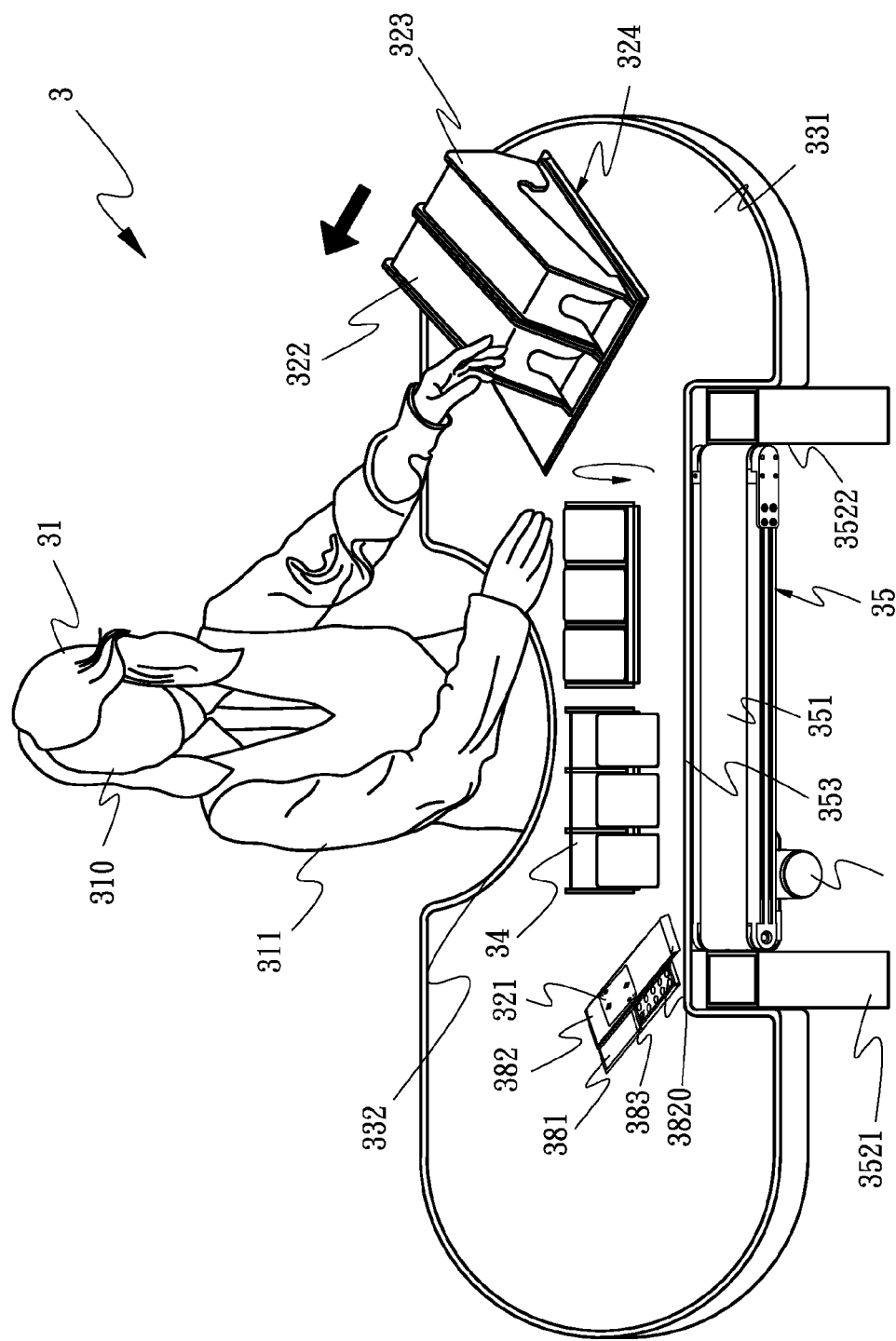
FIG. 26 is a structural schematic view of dual card shoes in another embodiment.
Figure 27:
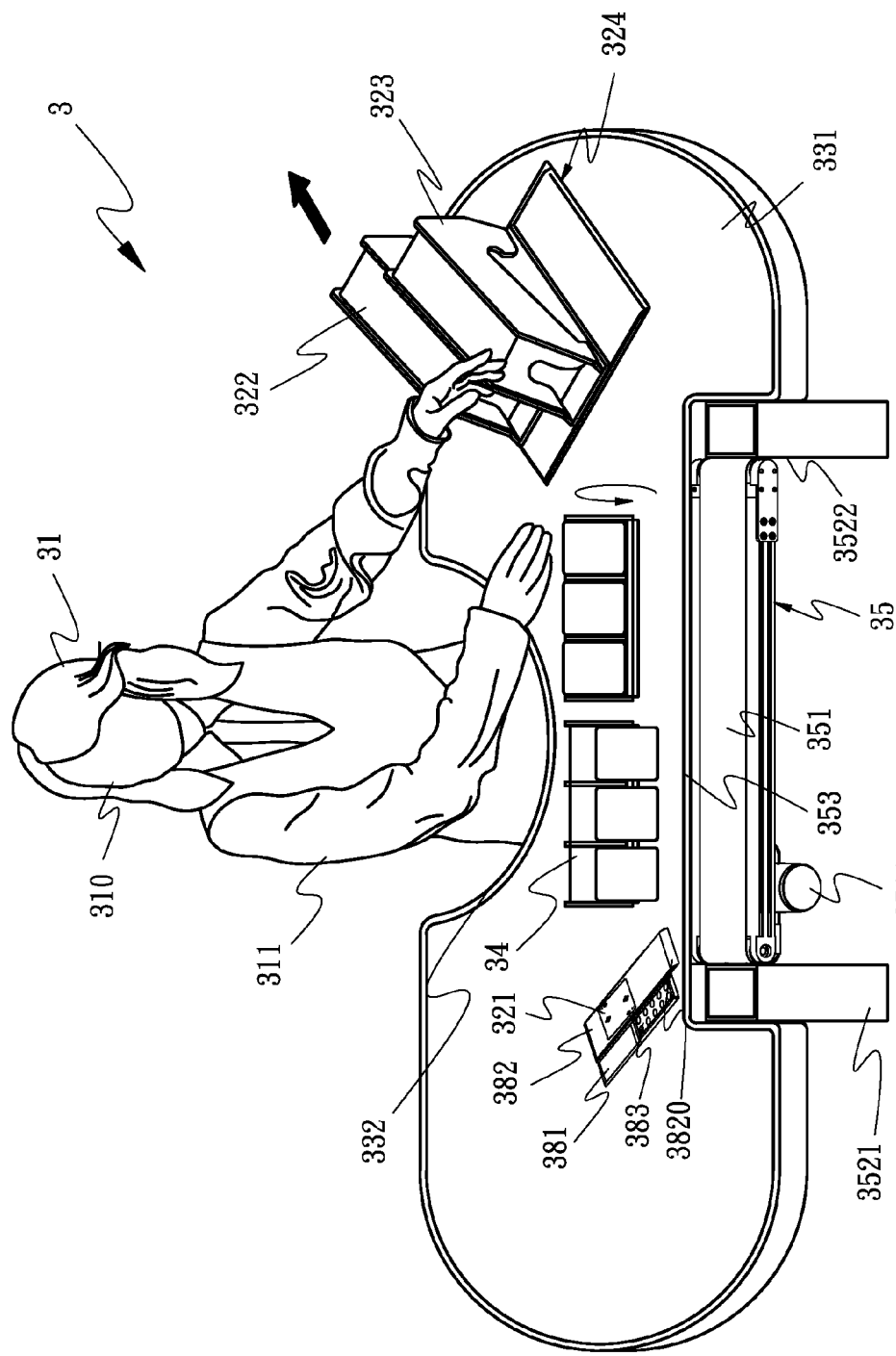
FIG. 27 is a structural schematic view of dual card shoes in another embodiment.

Referring to FIGS. 26, 27, which illustrate the first card shoe 322, the second card shoe 323 and the first shift device 324 are placed on the desktop 331 of the table 33. When two groups of players play poker games, the steps for poker cards 321 inside the first card shoe 322 and then poker cards 321 inside the second card shoe 323 fetched by the robotic arm 311 sequentially are shown as follows:

Poker cards 321 inside the first card shoe 322 are fetched by the robotic arm 311 first;

the first shift units 3241 on the first shift device 324 enables the first card shoe 322 and the second card shoe 323 to be translated toward the robotic arm 311 and the second card shoe 323 to be shifted to the position at which the first card shoe 322 stayed (as shown in FIG. 27);

the second shift unit 3242 on the first shift device 324 allows the first card shoe 322 to be moved backward; and poker cards 321 inside the second card shoe 323 are fetched by the robotic arm 311.

In the above steps, the sequential movement of either the first card shoe 322 or the second card shoe 323 relative to the first shift units 3241 and the second shift unit 3242 is unlimited. In other words, the second shift unit 3242 enables the first card shoe 322 to be moved backward first; then, the first shift units 3241 allow both the first card shoe 322 and the second card shoe 323 to be translated toward the robotic arm 311 simultaneously in order not to obstruct the robotic arm 311 which is fetching poker cards 321 inside the second card shoe 323 without interference of the first card shoe 322. In virtue of the first shift units 3241 and the second shift unit 3242, both of which coordinate with each other, the first card shoe 322 is moved backward or away from the second card shoe 323.

Moreover, the steps for poker cards 321 inside the second card shoe 323 and then poker cards 321 inside the first card shoe 322 fetched by the robotic arm 311 sequentially are shown as follows:

Poker cards 321 inside the second card shoe 323 are fetched by the robotic arm 311 first;

the second shift unit 3242 on the first shift device 324 enables the first card shoe 322 to be moved forward;

the first shift units 3241 on the first shift device 324 allows both the first card shoe 322 and the second card shoe 323 to be translated away from the robotic arm 311 simultaneously and the first card shoe 322 to be shifted to the position at which the second card shoe 323 stayed; and poker cards 321 inside the first card shoe 322 are fetched by the robotic arm 311.

In the mechanism of dual card shoes, the first shift units 3241 and the second shift unit 3242 are slide rails or tooth gears and either the first card shoe 322 or the second card shoe 323 is shifted linearly or nonlinearly.

Figure 28:
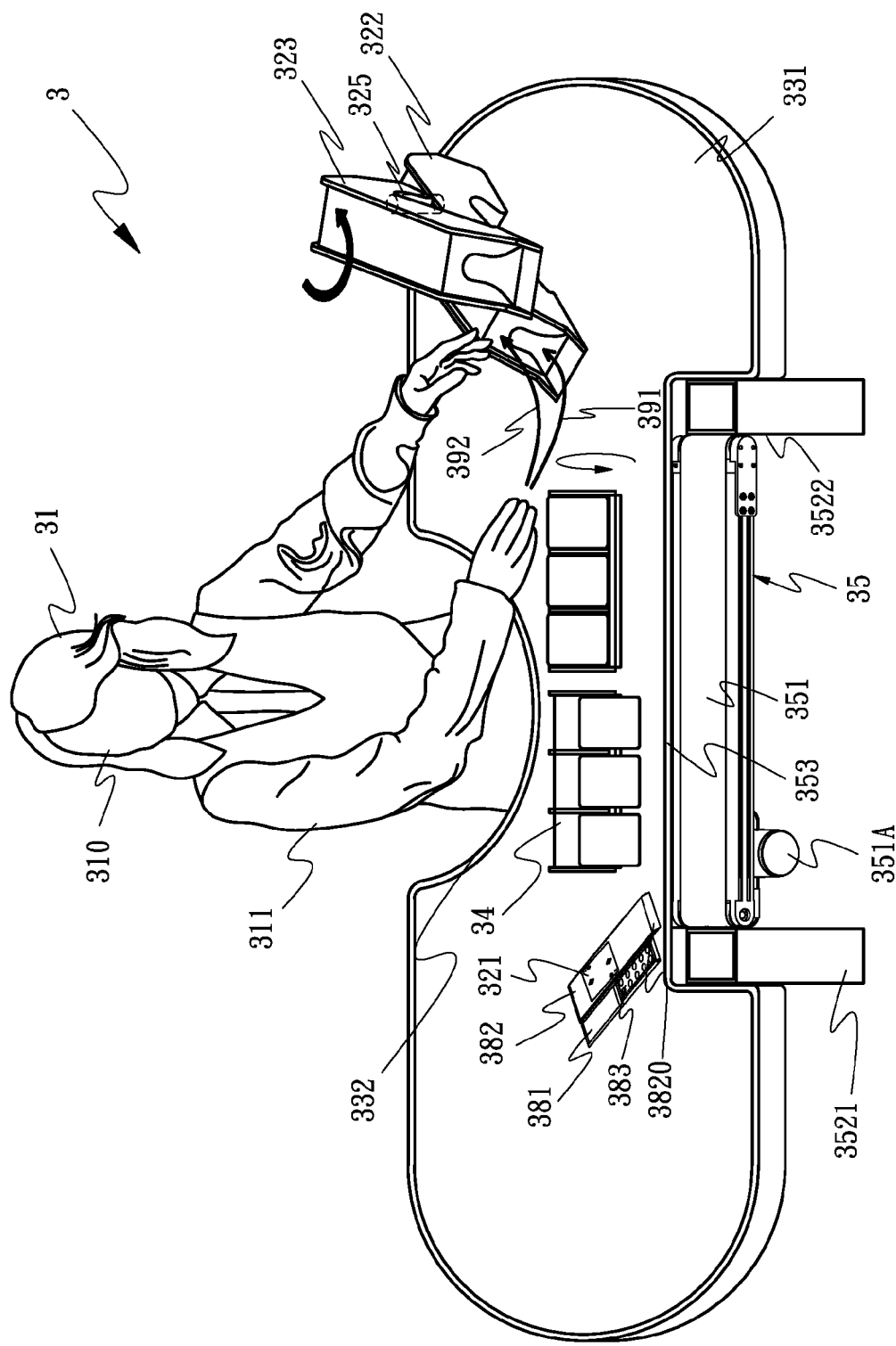
FIG. 28 is a structural schematic view of dual card shoes in another embodiment.

Referring to FIG. 28, which illustrates the first card shoe 322, the second card shoe 323 and a second shift device 325 are placed on the desktop 331 of the table 33 in another embodiment. As shown in FIG. 28, the first card shoe 322 underneath and the second card shoe 323 at top are staggered vertically and the second shift device 325, which are embedded between the first card shoe 322 and the second card shoe 323, is rotated about one end of the second card shoe 323 (as shown in FIG. 28). When two groups of players play poker games, the steps for poker cards 321 inside the first card shoe 322 and then poker cards 321 inside the second card shoe 323 fetched by the robotic arm 311 sequentially are shown as follows:

The second card shoe 323 is rotated away from the robotic arm 311 by the second shift device 325;

poker cards 321 inside the first card shoe 322 are fetched by the robotic arm 311 which is moved along a first fetched path 391;

the second card shoe 323 rotated toward the robotic arm 311 by the second shift device 325 goes back to the home position at which the second card shoe 323 and the first card shoe 322 are staggered vertically; and poker cards 321 inside the second card shoe 323 are fetched by the robotic arm 311 which is moved along a second fetched path 392.

Moreover, the steps for poker cards 321 inside the second card shoe 323 and then poker cards 321 inside the first card shoe 322 fetched by the robotic arm 311 sequentially are shown as follows:

Poker cards 321 inside the first card shoe 322 are fetched by the robotic arm 311 which is moved along a second fetched path 392;

the second card shoe 323 is rotated toward the robotic arm 311 by the second shift device 325; and poker cards 321 inside the first card shoe 322 are fetched by the robotic arm 311 which is moved along a first fetched path 391.

In the mechanism of dual card shoes, the second shift device 325 can be designed as, without limitation, a rotational shaft connected electrically and embedded between the first card shoe 322 and the second card shoe 323.

Figure 29:
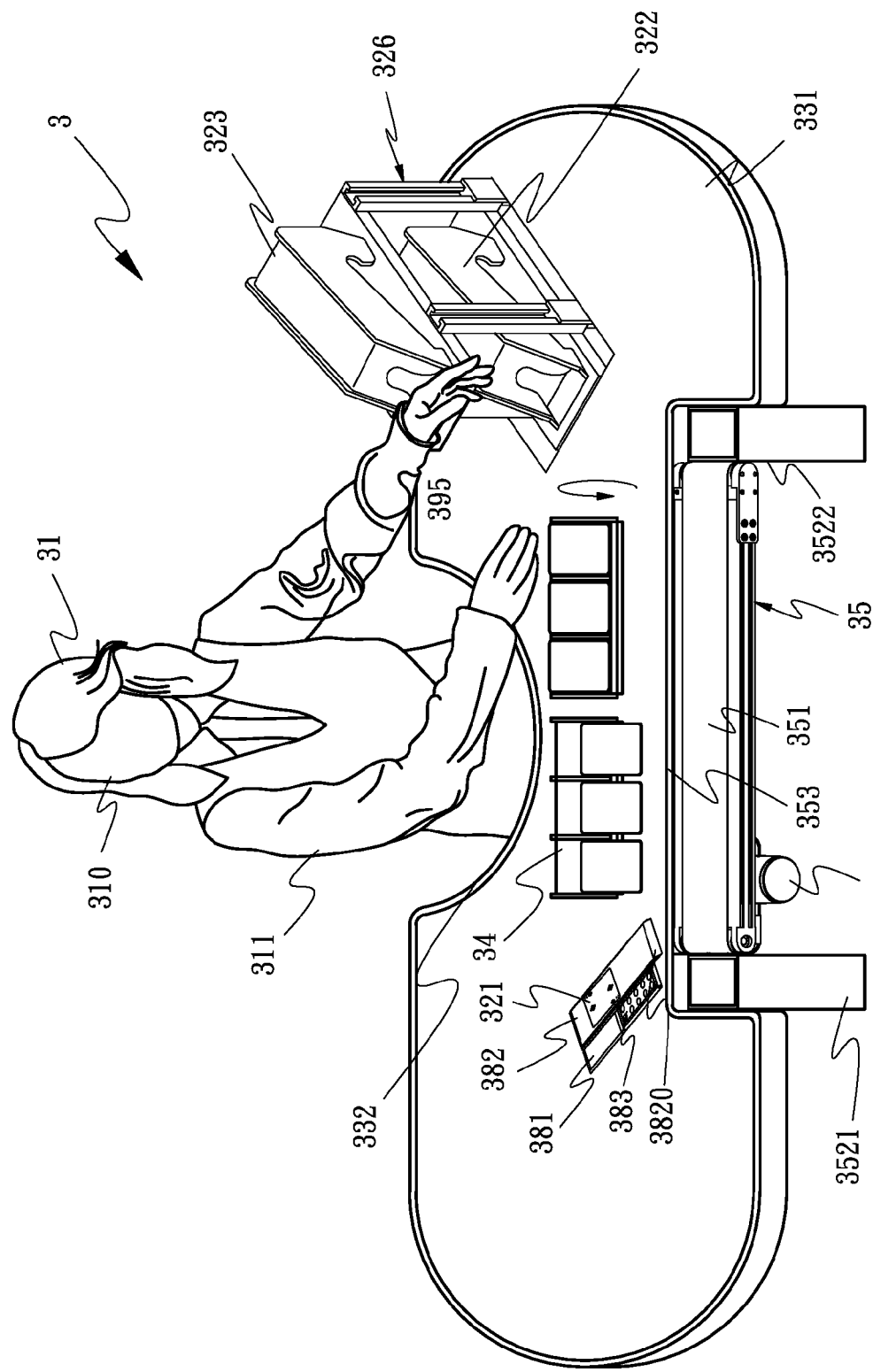
FIG. 29 is a structural schematic view of dual card shoes in another embodiment.

Referring to FIG. 29, which illustrates a third shift device 326 is placed on the table 33 (or at one side) in another embodiment for holding the first card shoe 322 and the second card shoe 323 inside wherein the first card shoe 322 underneath and the second card shoe 323 at top are staggered vertically such that poker cards 321 inside the first card shoe 322 are fetched by the robotic arm 311 directly. On the other hand, the robotic arm 311 is fetching poker cards 321 inside the second card shoe 323 when the first card shoe 322 was lowered by the third shift device 326 and kept under the table 33 (or at the other side), as shown in FIG. 30.

Figure 30:
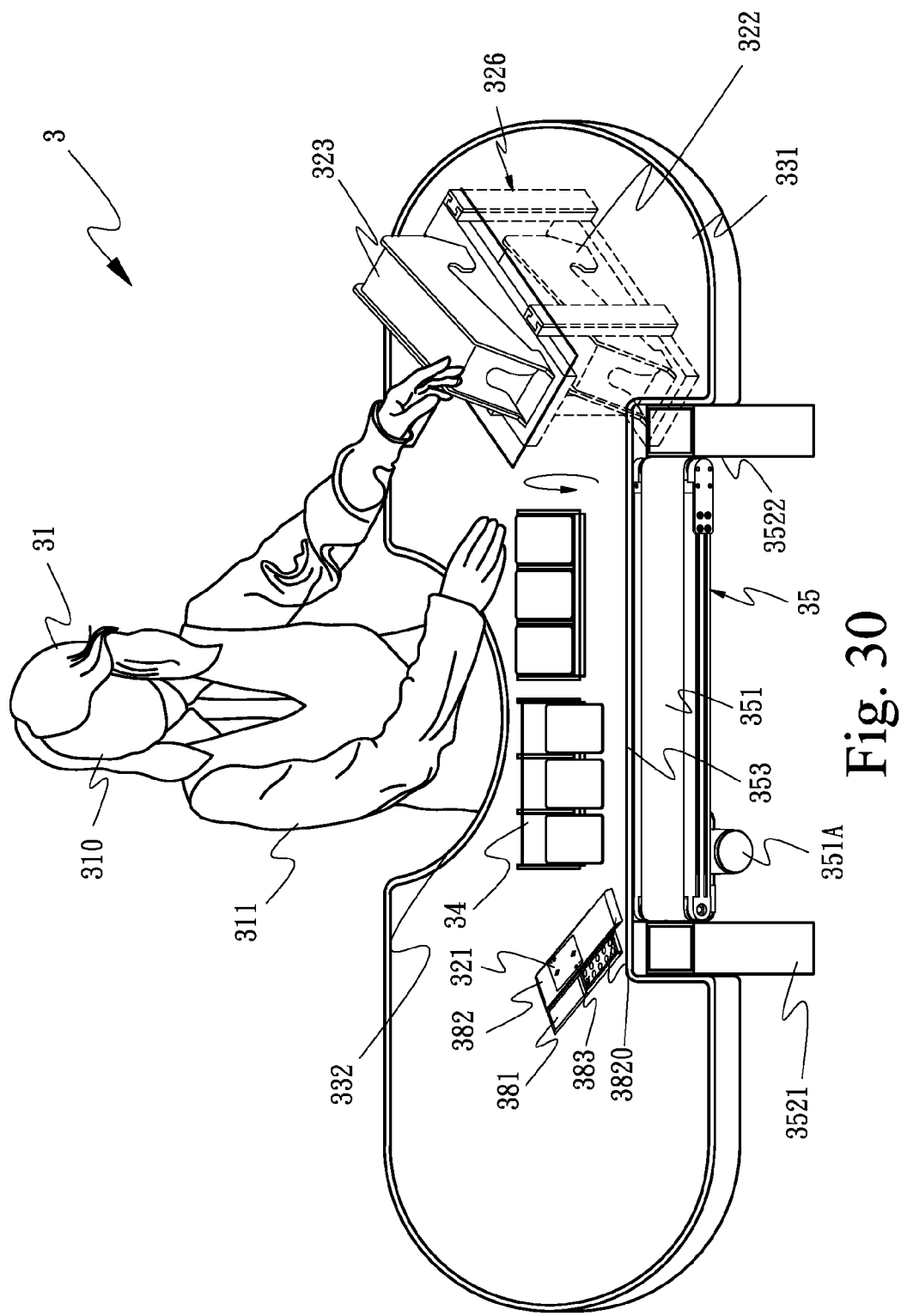
FIG. 30 is a structural schematic view of dual card shoes in another embodiment.

When two groups of players play poker games, the steps for poker cards 321 inside the first card shoe 322 and then poker cards 321 inside the second card shoe 323 fetched by the robotic arm 311 sequentially are shown as follows:

Poker cards 321 inside the first card shoe 322 are fetched by the robotic arm 311 first;

both the first card shoe 322 and the second card shoe 323 are moved downward by the third shift device 326 such that the second card shoe 323 is leveled with the desktop (as shown in FIG. 30); and poker cards 321 inside the second card shoe 323 are fetched by the robotic arm 311.

Moreover, the steps for poker cards 321 inside the second card shoe 323 and then poker cards 321 inside the first card shoe 322 fetched by the robotic arm 311 sequentially are shown as follows:

Both the first card shoe 322 and the second card shoe 323 are moved downward by the third shift device 326 such that the second card shoe 323 is leveled with the desktop (as shown in FIG. 30);

poker cards 321 inside the second card shoe 323 are fetched by the robotic arm 311;

both the first card shoe 322 and the second card shoe 323 are moved upward by the third shift device 326 such that the first card shoe 322 is leveled with the desktop (as shown in FIG. 29); and poker cards 321 inside the first card shoe 322 are fetched by the robotic arm 311.

Figure 31:
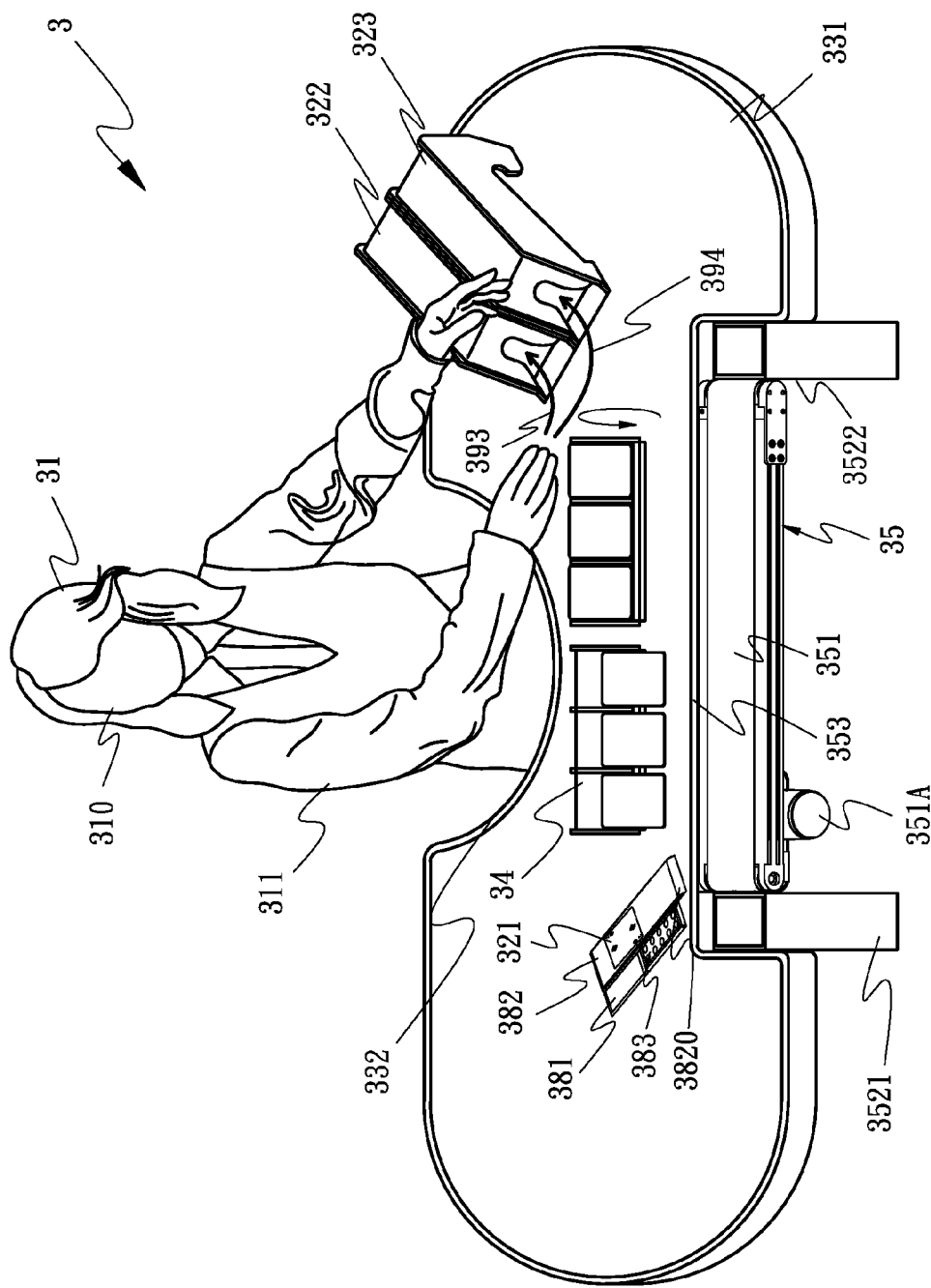
FIG. 31 is a structural schematic view of dual card shoes in another embodiment.

Referring to FIG. 31, which illustrates both the first card shoe 322 and the second card shoe 323 are adjacent to each other and placed on the desktop 331 of the table 33 in another embodiment. When two groups of players play poker games, poker cards 321 inside the first card shoe 322 and poker cards 321 inside the second card shoe 323 are fetched by the robotic arm 311 according to a third fetched path 393 and a fourth fetched path 394, respectively.

Figure 32:
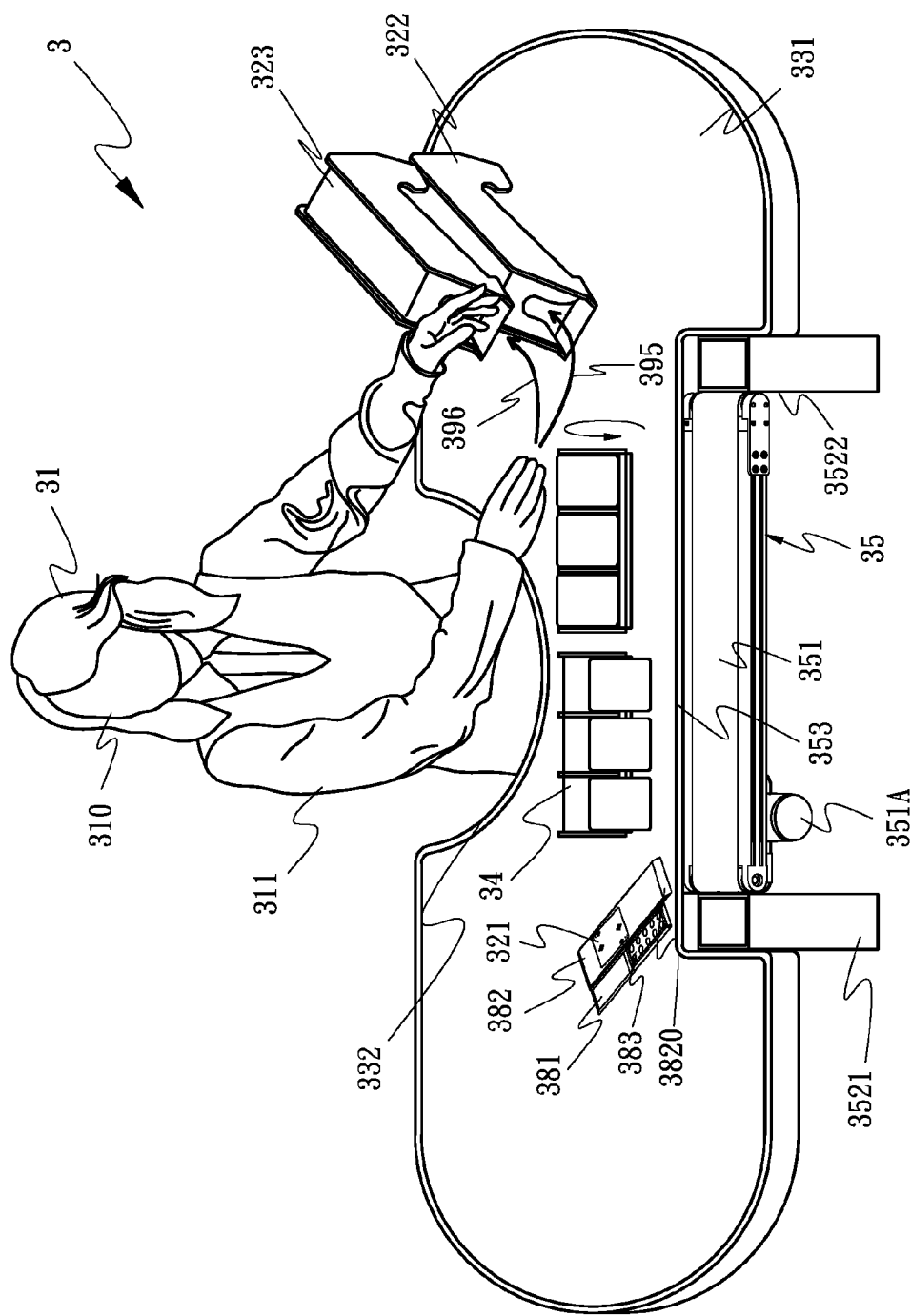
FIG. 32 is a structural schematic view of dual card shoes in another embodiment.

Referring to FIG. 32, which illustrates both the first card shoe 322 and the second card shoe 323 are staggered vertically in a further embodiment. When two groups of players play poker games, poker cards 321 inside the first card shoe 322 and poker cards 321 inside the second card shoe 323 are fetched by the robotic arm 311 according to a fifth fetched path 395 and a sixth fetched path 396, respectively.

In the mechanism of dual card shoes subject to the rule of a poker game, poker cards 321 fetched from a single card shoe 32 must be recollected in a separate retrieving box 352. Accordingly, in all embodiments for dual card shoes, the retrieving box 352 further comprises a first retrieving box 3521 and a second retrieving box 3522. The electric conveyer belt 351 has one end opposite to the opening on the first retrieving box 3521 and the other end opposite to the opening on the second retrieving box 3522. The electric conveyer belt 351 on which poker cards 321 fetched from the first card shoe 322 are distributed is driven to be rotated by a conveyer motor 351A receiving a command from the controller 302 such that the poker cards 321 on the electric conveyer belt 351 are shifted toward and recollected in the first retrieving box 3521; the electric conveyer belt 351 on which poker cards 321 fetched from the second card shoe 323 are distributed is driven to be rotated by a conveyer motor 351A receiving a command from the controller 302 such that the poker cards 321 on the electric conveyer belt 351 are shifted toward and recollected in the second retrieving box 3522. As such, poker cards 321 fetched from each single card shoe 32 are definitively recollected in a separate retrieving box 352 and compliant with the rule of a poker game. In summary, the design with applications of dual card shoes in an online reality poker game contributes to poker games played by two groups of players simultaneously without a time difference instead of by one group of players only in each single round. In practice, the game efficiency and the economic output of poker games are promoted because each person in two groups of players experiences a poke game uninterrupted and has no intention to leave a gambling party due to less waiting time.

The above disclosure is related to the detailed technical contents and inventive features thereof. People skilled in this field may proceed with a variety of modifications and replacements based on the disclosures and suggestions of the invention as described without departing from the characteristics thereof. Nevertheless, although such modifications and replacements are not fully disclosed in the above descriptions, they have substantially been covered in the following claims as appended.

What is claimed is:

1. A dealing robot device with dual card shoes, comprising:
    a robotic arm, wherein one portion of the robotic arm is a poker card acquiring portion configured to acquire an external poker card;
    an electric card shelf;
    a controller, electronically connected with the robotic arm and the electric card shelf, the controller further configuring the robotic arm or the electric card shelf to perform a motion according to instruction information;
    a first card shoe installed at a position from which poker cards are fetched by the robotic arm;
    a second card shoe installed at a position adjacent to the first card shoe;
    a first retrieving box for recollections of poker cards fetched from the first card shoe; and
    a second retrieving box for recollections of poker cards fetched from the second card shoe.

2. The device as claimed in claim 1, wherein the instruction information further comprises initial setting instruction information for initial setting the dealing robot device.

3. The device as claimed in claim 1, wherein the instruction information further comprises dealing instruction information for configuring the robotic arm to acquire the poker card and put the poker card on the electronic card shelf.

4. The device as claimed in claim 1, wherein dealing instruction information of the instruction information is set by value of the poker card.

5. The device as claimed in claim 4, wherein the dealing instruction information is configured to determine whether dealing the poker card of Nth round of banker.

6. The device as claimed in claim 4, wherein the dealing instruction information is configured to determine whether dealing the poker card of Nth round of player.

7. The device as claimed in claim 1, wherein the controller further configures the poker card acquiring portion of the robotic arm to acquire the poker card and put the poker card on the electric card shelf according to dealing instruction information.

8. The device as claimed in claim 7, wherein the dealing instruction information further comprises dealing round information, the controller further configures the poker card acquiring portion of the robotic arm to acquire the poker card and put on a specified position of the electric shelf according to the dealing round information.

9. The device as claimed in claim 7, wherein the controller further configures the electric card shelf to release the poker card thereon according to retrieve instruction information.

10. The device as claimed in claim 1, wherein the electric card shelf further comprises:
    a panel board, formed an incline angle with a table of setting environment;
    a bottom board;
    a shelf motor, wherein one of body of the shelf motor or output end of the shelf motor is connected to the panel board or the table, and the other one is connected to the bottom board;
    wherein, the shelf motor is triggered by the instruction information of the controller and configures the bottom board to actuate corresponding to the panel board so as to release the poker card on the electric card shelf.

11. The device as claimed in claim 1, wherein the electric card shelf further comprises:
    a panel board;
    a shelf motor, wherein one of body of the shelf motor or output end of the shelf motor is fixed on the panel board, and other one is fixed on a table of setting environment;
    wherein, the shelf motor is triggered by the instruction information of the controller and configures panel board to actuate corresponding to the table.

12. The device as claimed in claim 10, wherein the panel board further comprises convex structure, concave structure or combination of the convex structure and the concave structure.

13. The device as claimed in claim 1, further comprising a retrieving container neighbored to the electric card shelf, wherein setting position of the retrieving container is lower than setting position of the electric card shelf, opening portion of the retrieving container is corresponding to the electric card shelf so as to receive the poker card released by the electric card shelf.

14. The device as claimed in claim 1, further comprising an electric conveyer belt device neighbored to the electric card shelf and a table of setting environment, wherein setting position of the electric conveyer belt device is lower than setting position of the electric card shelf, the electric conveyer belt device is corresponding to the electric card shelf so as to receive the poker card released by the electric card shelf.

15. The device as claimed in claim 14, further comprising a retrieving frame configured at a position between the electric card shelf and the electric conveyer belt device so as to guide the released poker card to the electric conveyer belt device when the electric card shelf releasing the poker card.

16. The device as claimed in claim 14, further comprising a retrieving box neighbored to the table, wherein opening portion of the retrieving box is corresponding to one end of the electric conveyer belt device so as to retrieve the poker card on the electric conveyer belt device when the electric conveyer belt device operating.

17. The device as claimed in claim 14, wherein the electric card shelf and the electric conveyer belt device are formed a quick release assembly, and the quick release assembly is configured to embed in the table.

18. The device as claimed in claim 1, further comprising an image acquiring module electrically connected with the controller, wherein setting position of the image acquiring module is neighbored to the output portion of the first card shoe or the second card shoe on a table.

19. The device as claimed in claim 1, wherein the poker card acquiring portion comprises a electric sucker, controlling port of the electric sucker is electrically connected with the controller, the controller further actuates the electric sucker when executing a card acquiring operation.

20. The device as claimed in claim 1, wherein the controller further loads a humanoid motion setting so as to selectively set a motion path of the robotic arm or facial expression of the dealing robot device.

21. The device as claimed in claim 1, further comprising a poker card abandoning kit, wherein the poker card abandoning kit comprises:
 displayer; and
 controlling circuit, connected with the displayer and the controller;
 wherein, the controller further drives the robotic arm to fetch the poker card and move to an abandoning place, and selectively drives the displayer directivity or drives the displayer by the controlling circuit so as to enable the displayer to display number of the abandoned poker cards when executing an abandoning instruction.

22. The device as claimed in claim 21, wherein the poker card abandoning kit further comprises a conveyer kit for abandoning the poker card, a controlling end of the conveyer kit connected with the controlling circuit, wherein the controller further selectively drives the conveyer kit directivity or drives the conveyer kit by the controlling circuit so as to enable the conveyer kit to retrieve the poker card abandoned on the conveyer when executing a recycle instruction.

23. The device as claimed in claim 1, wherein both the first card shoe and the second card shoe are abreast mounted at one side of a first shift device; the first shift device further comprises first shift units and a second shift unit; the first shift units enable the second card shoe to be transferred to a position at which the first card shoe stayed such that poker cards inside the second card shoe are fetched by the robotic arm.

24. The device as claimed in claim 23, wherein the second shift unit enables the first card shoe to be transferred away from the second card shoe before poker cards inside the second card shoe are fetched by the robotic arm.

25. The device as claimed in claim 1, wherein the first card shoe and the second card shoe are staggered vertically; the first card shoe stays underneath the second card shoe; the first card shoe and the second card shoe accommodate a second shift device in between; the second shift device enables the second card shoe to be rotated and translated away from the robotic arm such that poker cards inside the first card shoe are fetched by the robotic arm moved along a first fetched path; the second shift device enables the second card shoe to be rotated and translated toward the robotic arm such that poker cards inside the second card shoe are fetched by the robotic arm moved along a second fetched path.

26. The device as claimed in claim 1, wherein the first card shoe and the second card shoe are staggered vertically and held inside a third shift device; the first card shoe stays underneath the second card shoe; the third shift device enables the second card shoe to be shifted to a position at which the first card shoe stayed such that poker cards inside the second card shoe are fetched by the robotic arm.

27. The device as claimed in claim 1, wherein the first card shoe and the second card shoe are connected to each other in design; the robotic arm which is moved along a third fetched path fetches poker cards inside the first card shoe; the robotic arm which is moved along a fourth fetched path fetches poker cards inside the second card shoe.

28. The device as claimed in claim 27, wherein the first card shoe and the second card shoe can be arranged abreast or the first card shoe and the second card shoe can be staggered vertically such that the first card shoe stays underneath the second card shoe.

29. The device as claimed in claim 14, further comprising:
 a first retrieving box and a second retrieving box installed on the table wherein the first retrieving box has an opening opposite to one end of the electric conveyer belt and the second retrieving box has an opening opposite to the other end of the electric conveyer belt such that poker cards are transferred to the corresponding first retrieving box or the corresponding second retrieving box by the electric conveyer belt.

* * * * *